(12) United States Patent
Eguchi

(10) Patent No.: US 11,676,629 B1
(45) Date of Patent: Jun. 13, 2023

(54) SAMPLED-DATA POLYDYNE FEEDFORWARD POSITION CONTROL

(71) Applicant: Western Digital Technologies, Inc., San Jose, CA (US)

(72) Inventor: Takehiko Eguchi, Tokyo (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/575,963

(22) Filed: Jan. 14, 2022

(51) Int. Cl.
| | | |
|---|---|---|
| *G11B 5/55* | (2006.01) | |
| *G11B 5/31* | (2006.01) | |
| *G11B 5/48* | (2006.01) | |

(52) U.S. Cl.
CPC ............ *G11B 5/556* (2013.01); *G11B 5/3156* (2013.01); *G11B 5/488* (2013.01); *G11B 5/4813* (2013.01); *G11B 5/5565* (2013.01)

(58) Field of Classification Search
None
See application file for complete search history.

(56) References Cited

U.S. PATENT DOCUMENTS

| | | | | |
|---|---|---|---|---|
| 4,835,633 A * | 5/1989 | Edel | ...................... | G11B 21/085 360/78.12 |
| 4,894,599 A * | 1/1990 | Ottesen | ............... | G11B 21/083 360/78.12 |
| 5,151,639 A * | 9/1992 | Hasegawa | ............... | B41J 19/18 360/78.07 |
| 5,627,440 A * | 5/1997 | Yamamoto | ........... | G05B 19/416 318/568.22 |
| 5,801,894 A * | 9/1998 | Boutaghou | ............ | G11B 19/14 |
| 5,872,674 A * | 2/1999 | Eddy | .................... | G11B 21/085 360/77.04 |
| 5,912,782 A * | 6/1999 | Lee | ..................... | G11B 7/08529 360/78.04 |
| 6,005,742 A | 12/1999 | Cunningham et al. | | |
| 6,088,187 A | 7/2000 | Takaishi | | |
| 7,215,499 B1* | 5/2007 | Li | ........................ | G11B 5/5547 |
| 7,283,321 B1 | 10/2007 | Sun et al. | | |
| 9,117,471 B1* | 8/2015 | Liu | .................... | G11B 5/59627 |
| 9,911,442 B1 | 3/2018 | Kharisov et al. | | |
| 9,940,958 B1 | 4/2018 | Kiyonaga et al. | | |
| 10,049,691 B1 | 8/2018 | Gaertner et al. | | |
| 10,410,657 B1 | 9/2019 | Zhou et al. | | |
| 10,839,842 B1* | 11/2020 | Cao | .................... | G11B 5/59627 |
| 2004/0070863 A1* | 4/2004 | Guo | ..................... | G11B 5/5526 |

(Continued)

OTHER PUBLICATIONS

Atsumi, Takenori "Feedforward Control Using Sampled-Data Polynomial for Track Seeking in Hard Disk Drives", IEEE Transactions on Industrial Electronics, vol. 56, No. 5, pp. 1338-1346, May 2009.

(Continued)

*Primary Examiner* — Peter Vincent Agustin
(74) *Attorney, Agent, or Firm* — Neugeboren O'Dowd PC

(57) ABSTRACT

In illustrative aspects, a system comprises an actuator; a control object, controlled by the actuator; and one or more processing devices. The one or more processing devices are configured to perform positioning control of the control object via the actuator, wherein performing the positioning control comprises: generating a feedforward polydyne positioning control input; and outputting the feedforward polydyne positioning control input to the actuator.

20 Claims, 11 Drawing Sheets

(56) References Cited

U.S. PATENT DOCUMENTS

| 2005/0207057 | A1* | 9/2005 | Atsumi | G11B 5/5547 |
| --- | --- | --- | --- | --- |
| | | | | 360/78.04 |
| 2006/0158773 | A1* | 7/2006 | Semba | G11B 5/5547 |
| | | | | 360/78.06 |
| 2006/0233073 | A1* | 10/2006 | Pae | G11B 7/08511 |
| 2007/0230018 | A1* | 10/2007 | Schreck | G11B 5/6064 |

OTHER PUBLICATIONS

Kang et al., "Design of Seeking Control Based on Two-Degree-of-Freedom Controller Using Frequency Shaped Final-State Control", The International Federation of Automatic Control, 17th IFAC World Congress, pp. 1803-1808, Jul. 6-11, 2008.

Kanzaki et al., "Polydyne Cam Mechanisms for Typehead Positioning", Journal of Engineering for Industry, pp. 250-254, Feb. 1972.

Kawakita et al., "Active Sampled-Data Controlled Suspension in Automobile with Vibration Manipulation Functions: Intermittent Desired Elongation Control of Actuator", International Journal of Automotive Engineering, vol. 7, pp. 77-84, 2016.

Kobayashi et al., "Track Seek Control for Hard Disk Dual-Stage Servo Systems", IEEE Transactions on Magnetics, vol. 37, No. 2, pp. 949-954, Mar. 2001.

Shah, Prateek "Joint Feedback Feedforward Data Driven Control Design and Input Shaping Techniques for Multi Actuator Hard Disk Drives", UC Berkeley Electronic Theses and Dissertations, 133 pages, 2020.

Yan et al., "Polydyne Servo-Cam Design", Journal of the Chinese Society of Mechanical Engineers, vol. 22, No. 2, pp. 1-3, Apr. 1, 2001.

\* cited by examiner

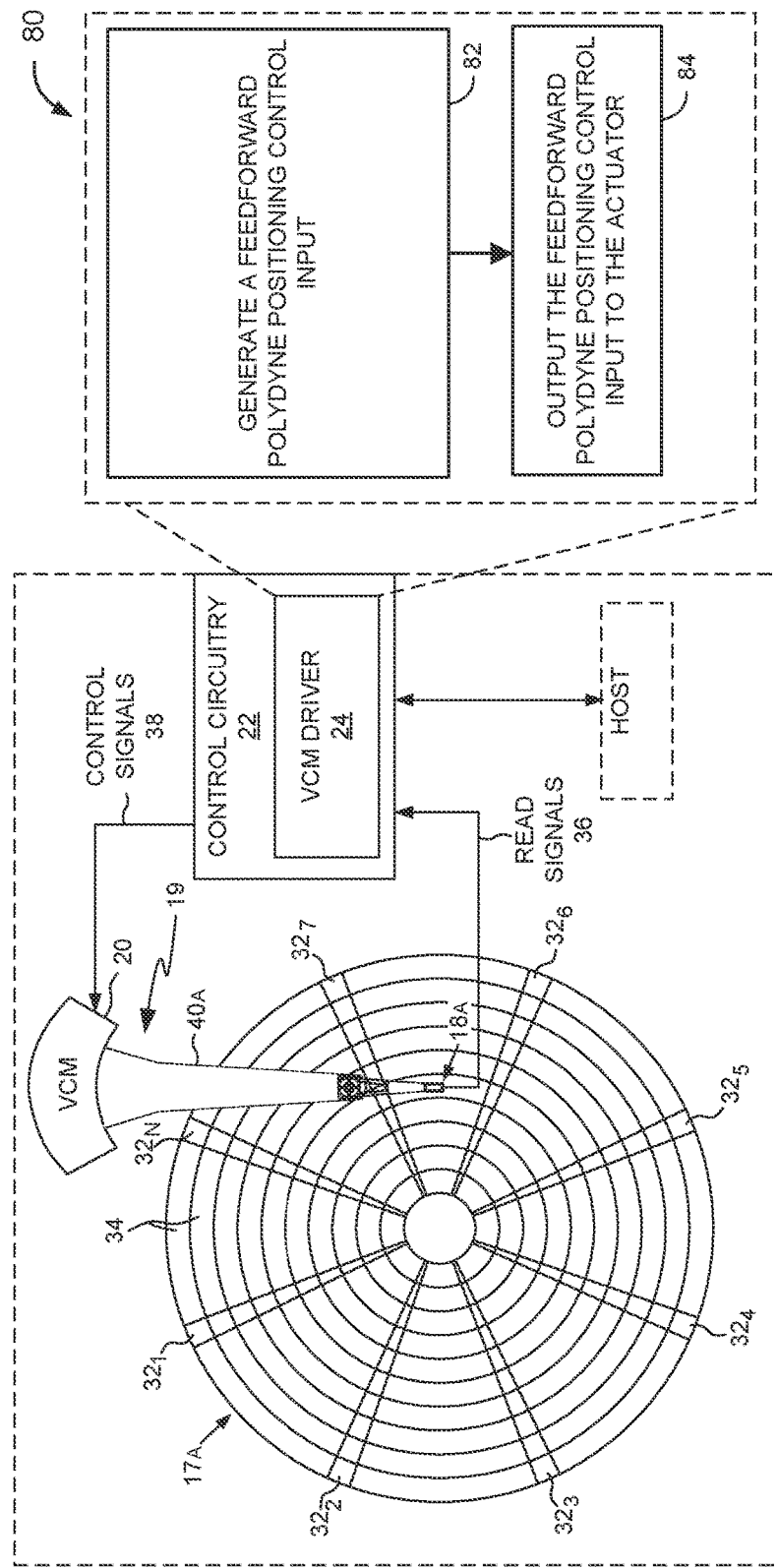
FIG. 2A
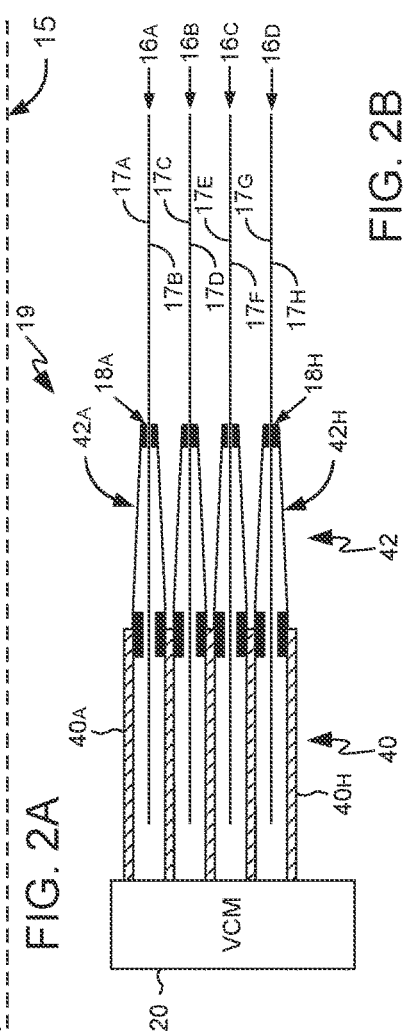
FIG. 2B
FIG. 2C

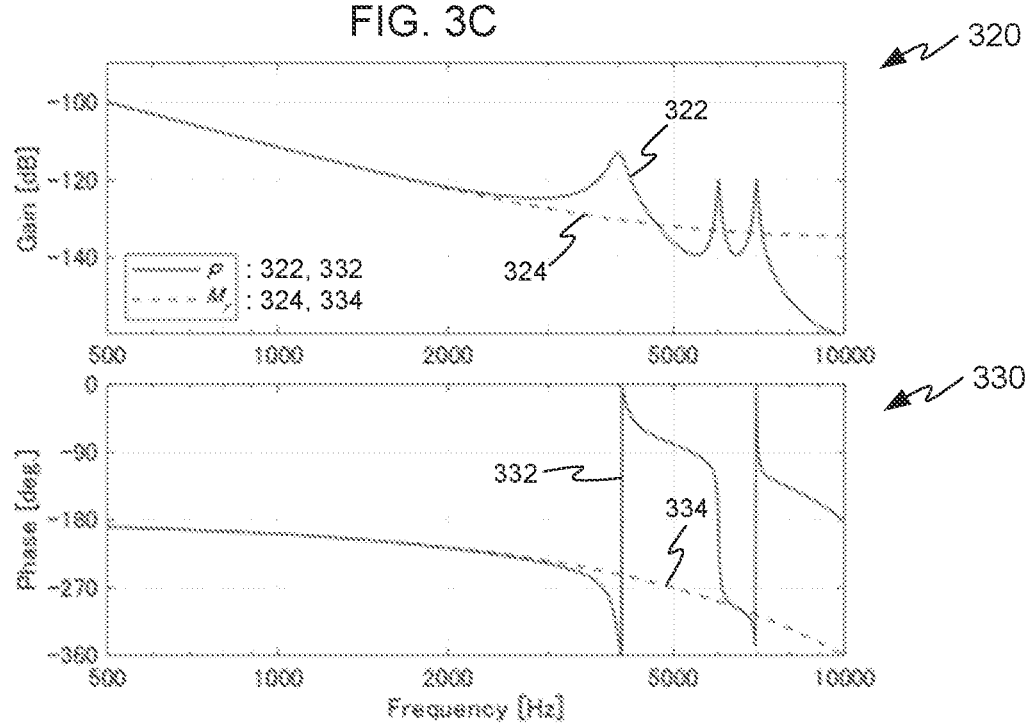
FIG. 3C
FIG. 3D
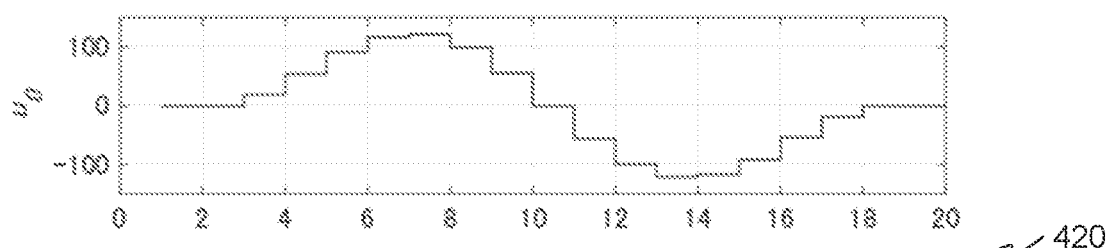
FIG. 4A
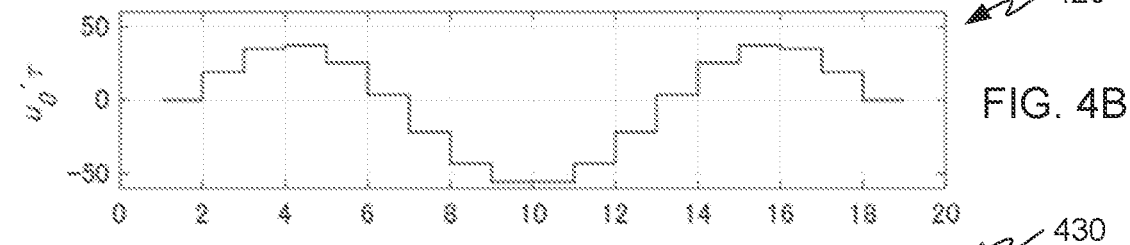
FIG. 4B
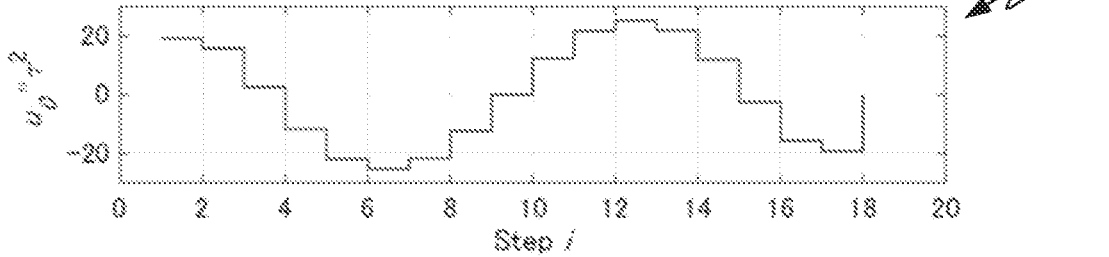
FIG. 4C

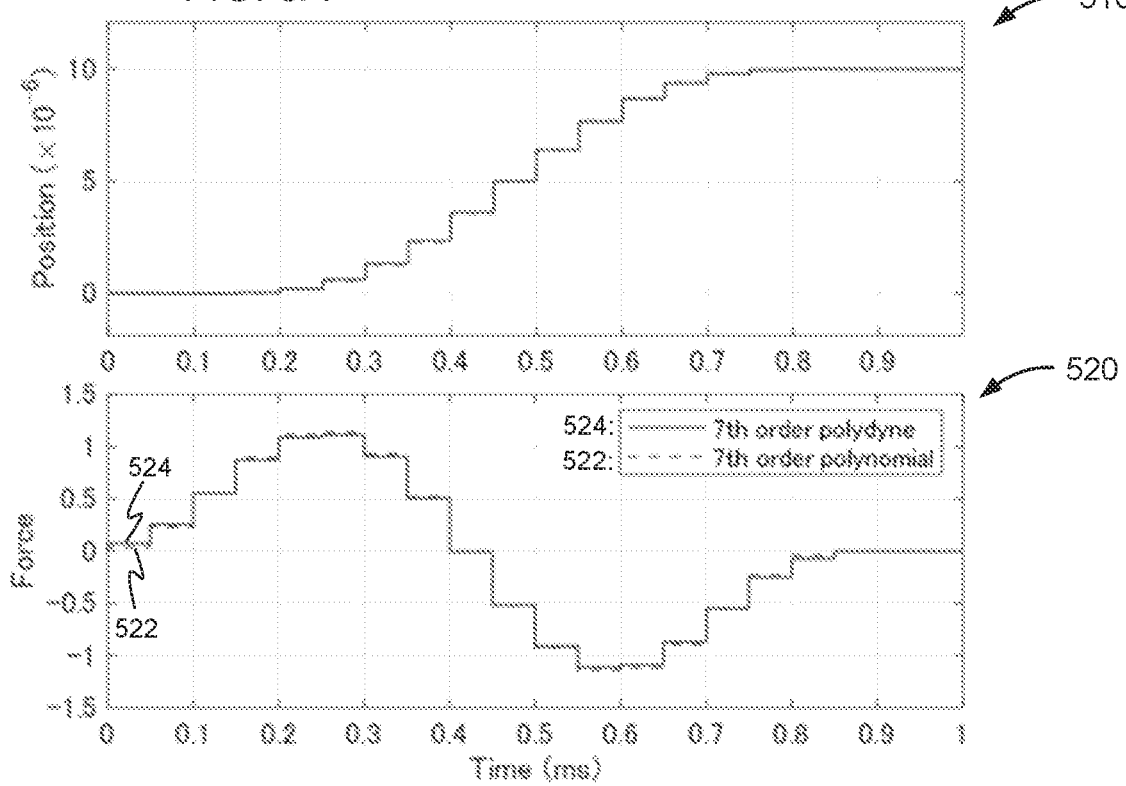
FIG. 5A
FIG. 5B
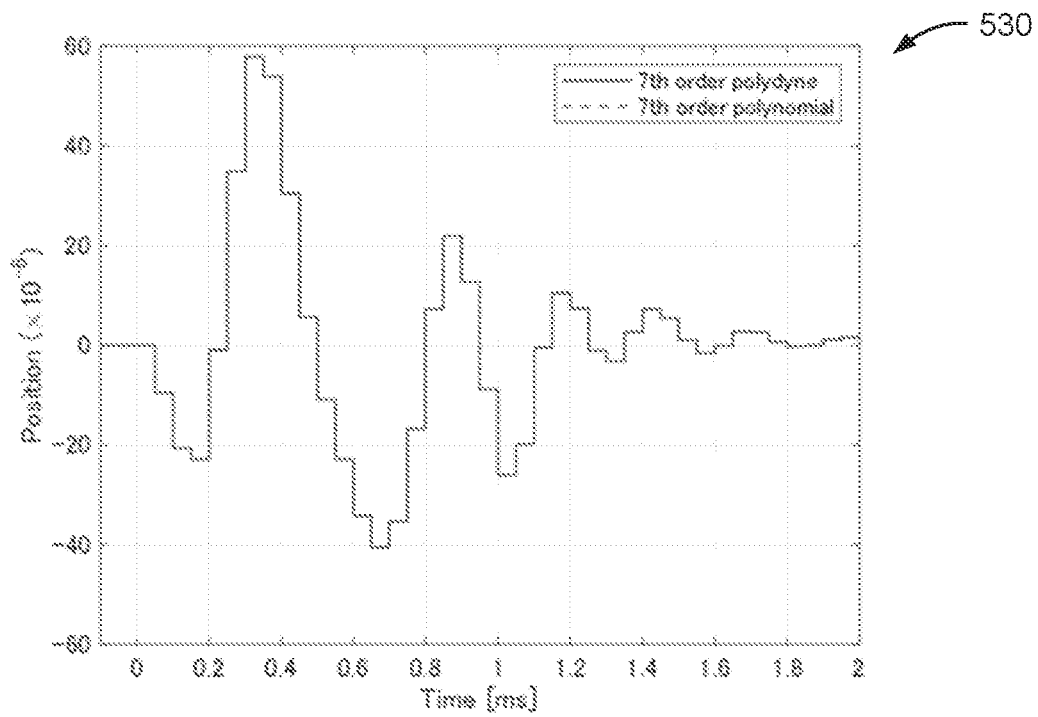
FIG. 5C

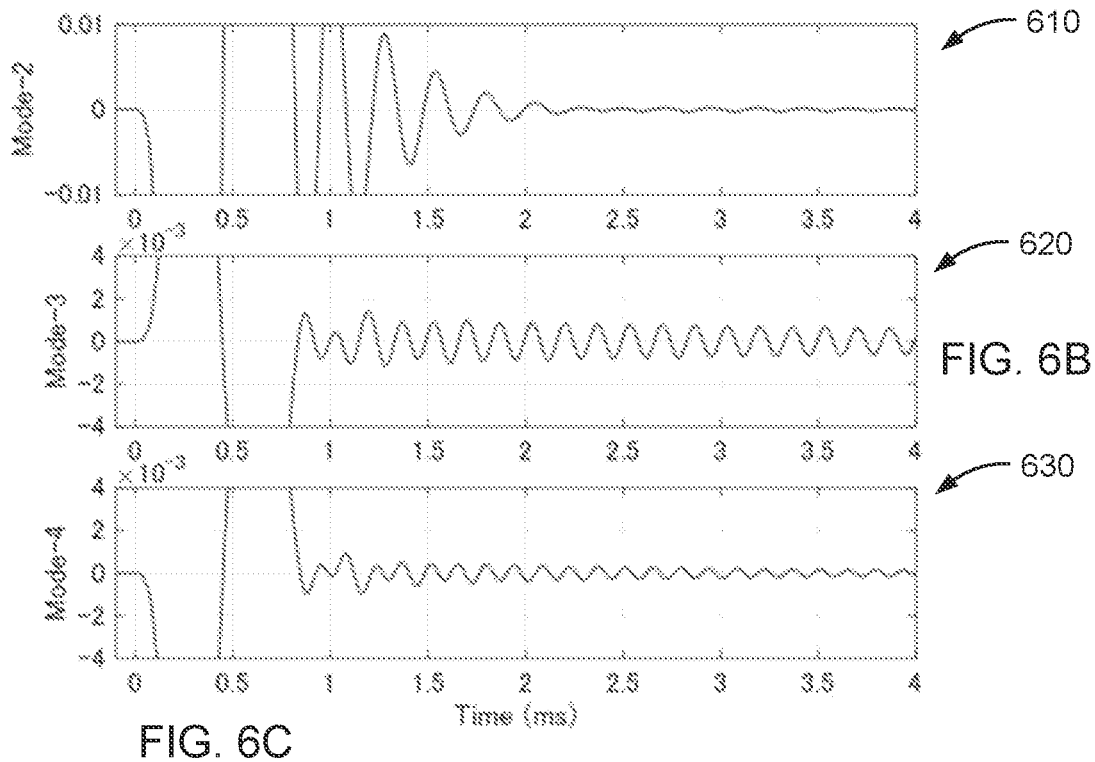
FIG. 6A
FIG. 6B
FIG. 6C
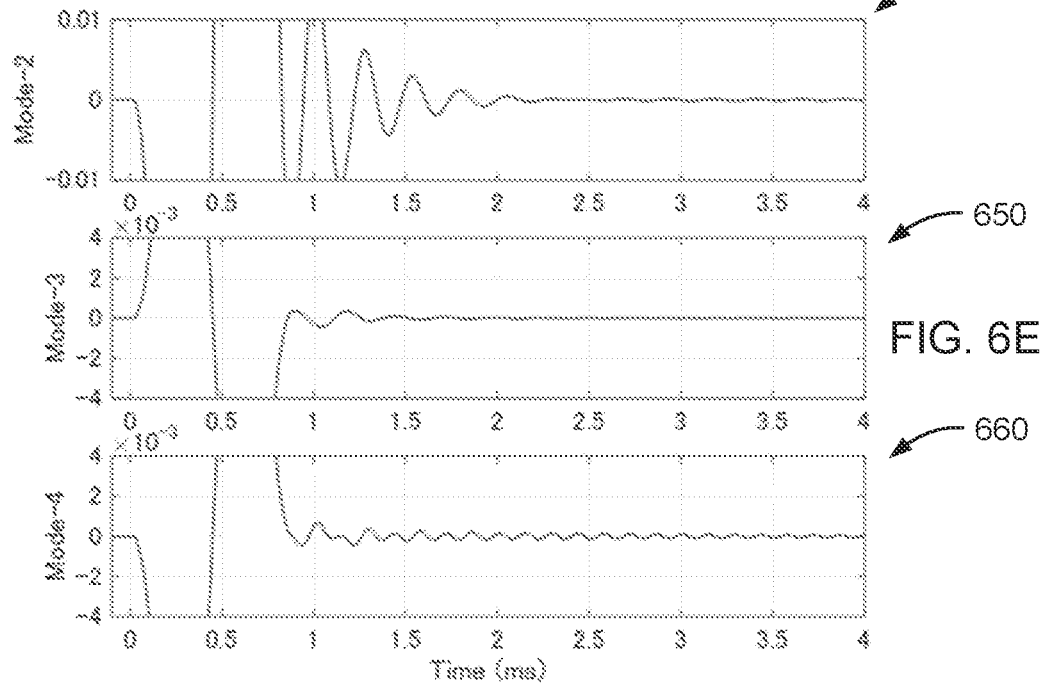
FIG. 6D
FIG. 6E
FIG. 6F

FIG. 7A
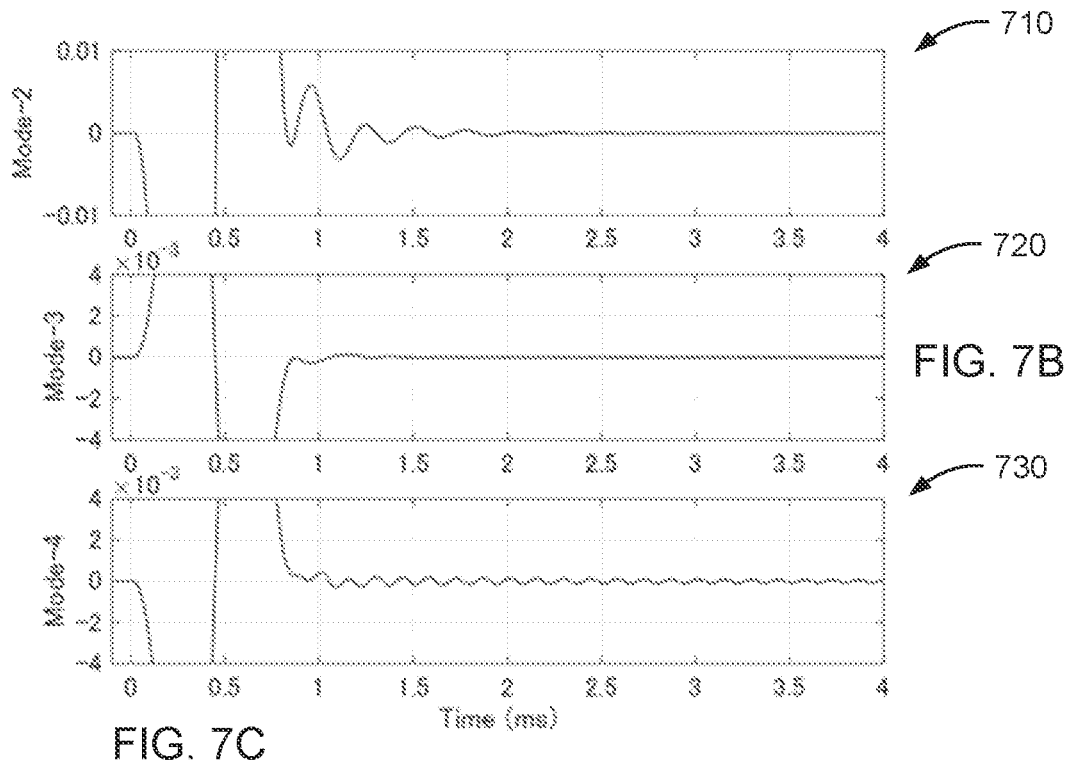
FIG. 7B
FIG. 7C
FIG. 7D
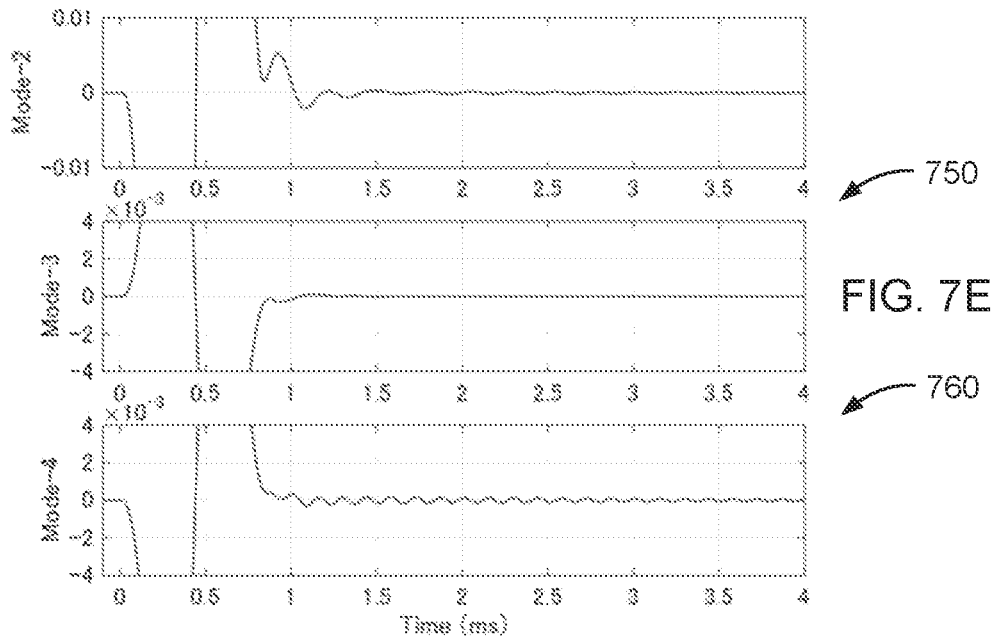
FIG. 7E
FIG. 7F

FIG. 8A
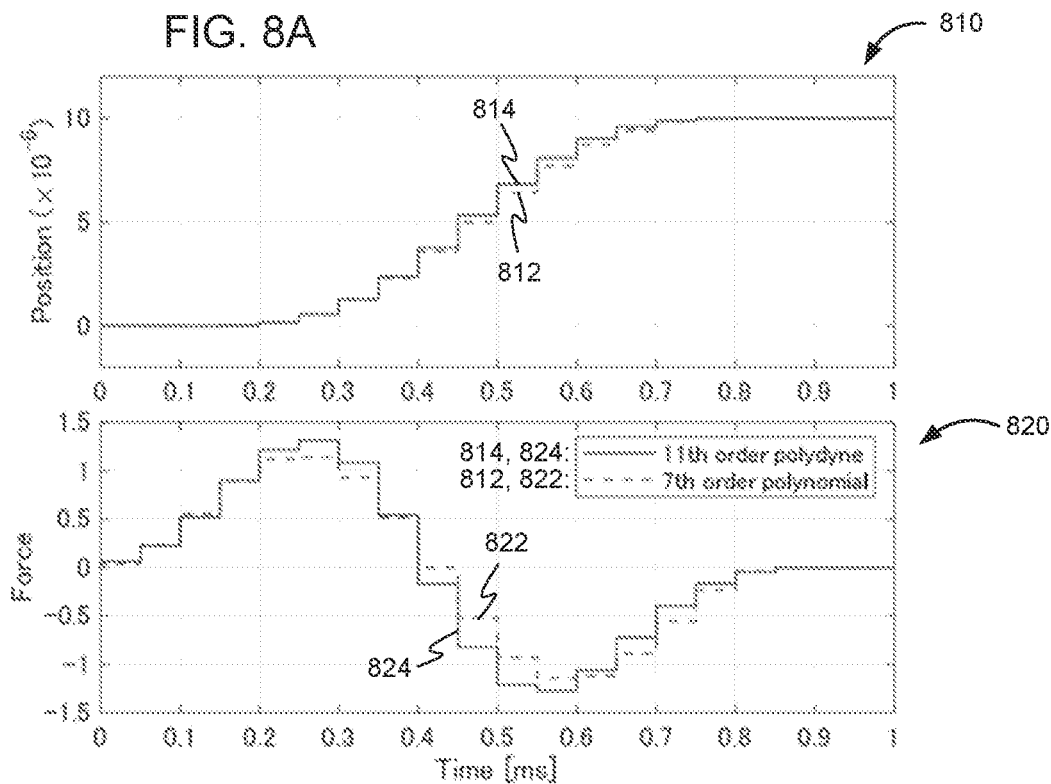
FIG. 8B
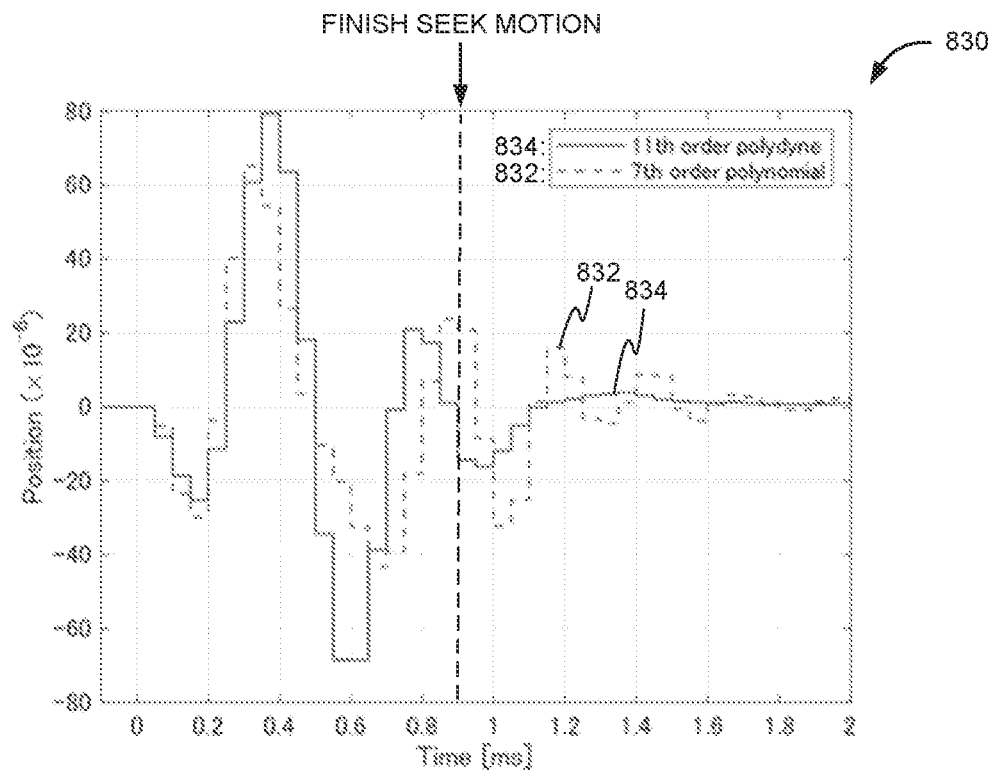
FIG. 8C

FIG. 9A
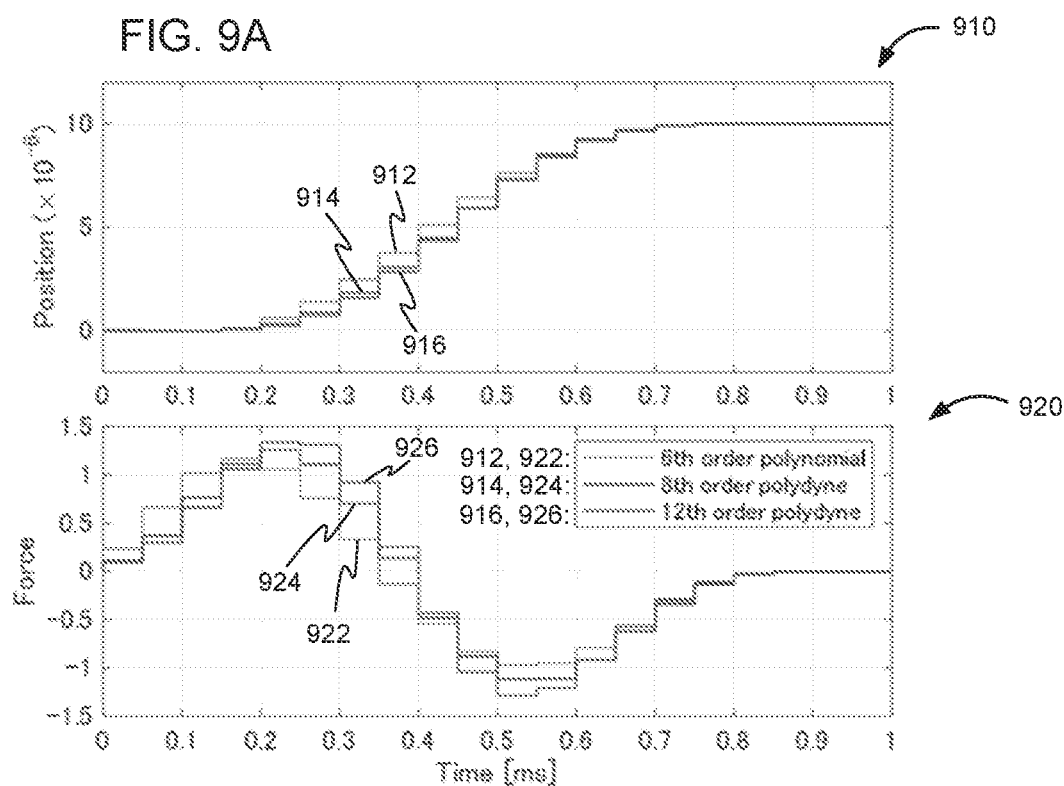
FIG. 9B
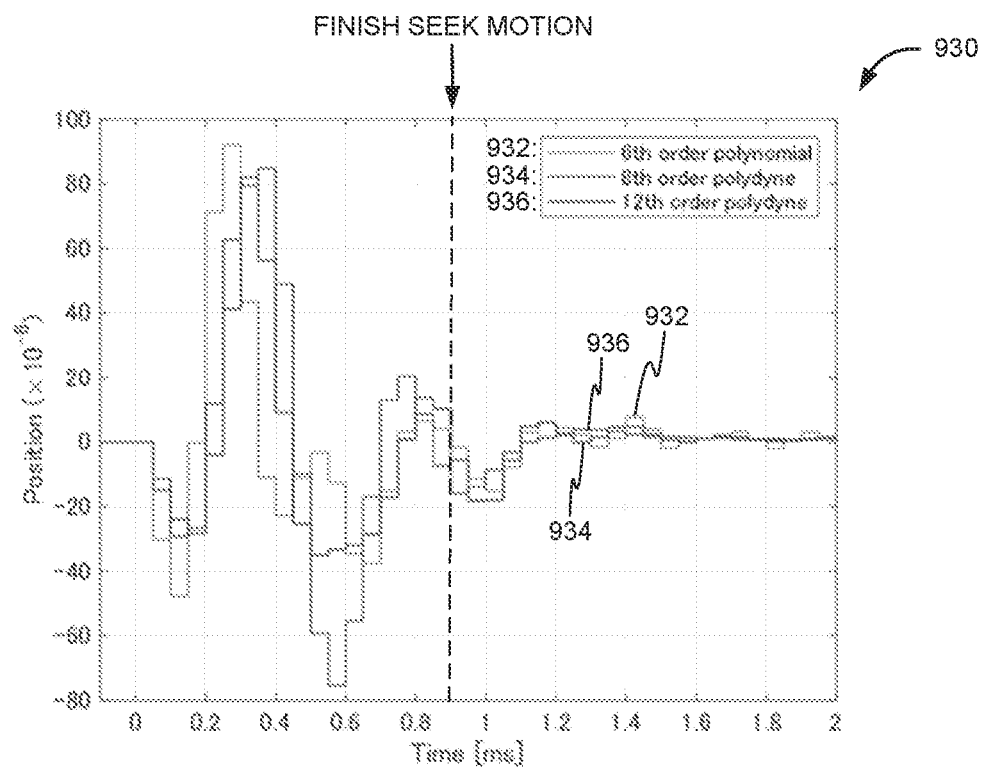
FIG. 9C

SAMPLED-DATA POLYDYNE FEEDFORWARD POSITION CONTROL

BACKGROUND

Various technologies and product categories require high-speed and/or high-precision positioning control. One example is data storage devices such as disk drives, which must perform high-speed and high-precision positioning control of read/write heads proximate to media surfaces. Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

Various aspects disclosed herein provide sampled-data polydyne feedforward positioning control for systems requiring positioning control, particularly high-speed and/or high-precision positioning control, such as data storage devices, systems, and methods, among other aspects. Sampled-data polydyne feedforward positioning control may provide faster and more precise positioning control for seek operations in a data storage system, among many other applications.

To meet increasing demand for higher data transfer rate, it has been a persistent, long-term goal for hard disk drive control systems to further reduce data access times. Such requirements for high-speed motion control often lead to large transient vibrations that can disturb high-precision control and can be detrimental to the device. It is fundamentally effective to use feedforward control to accomplish high-speed and high-precision positioning. In the typical prior art, this problem for control systems is formulated in continuous-time domain. Novel, inventive aspects of this disclosure comprise generating reference inputs in discrete-time domain when the sampling rate of the control system is low. Systems and methods of this disclosure may comprise formulating polydyne curves in discrete-time domain to be used for suppressing transient vibrations at high frequencies.

Systems of this disclosure may generate a discrete-time formulation of polydyne curves. A novel derivation of the formulation of polydyne curves has been performed in accordance with novel methods of this disclosure. The residual vibration of a one-degree-of-freedom (1-DOF) vibration system may be expressed as a Duhamel integral. If the input force is given as a continuous-time polynomial, the solution may be obtained by applying the integral by parts to it repeatedly. By using this solution, it was confirmed that example polydyne curves of this disclosure can suppress transient vibrations due to a resonant mode. Next, the residual vibration in the sampled-data system was also derived in an analogous way as in the continuous-time system. Finally, conditions to let the residual vibrations go to zero were clarified, and the sampled-data polydyne was defined. Systems of this disclosure may obtain a polydyne curve to suppress two resonant modes by applying the same process twice, and obtaining a sampled-data polydyne to suppress two resonant modes. Both the original polydyne and sampled-data polydyne curves may use a basis polynomial that satisfies the conditions of continuity at the beginning and end of the trajectory. To control the position and velocity at the end of the motion, they may be treated accurately in the sampled-data system. Aspects of this disclosure comprise using a sampled-data polynomial as the basis polynomial to solve this problem, and to generate sampled-data polydyne feedforward inputs for fast and precise positioning control.

Various illustrative aspects are directed to a system comprising an actuator; a control object, controlled by the actuator; and one or more processing devices. The one or more processing devices are configured to perform positioning control of the control object via the actuator, wherein performing the positioning control comprises: generating a feedforward polydyne positioning control input; and outputting the feedforward polydyne positioning control input to the actuator.

Various illustrative aspects are directed to a method comprising generating, by one or more processing devices, a feedforward polydyne positioning control input. The method further comprises outputting, by the one or more processing devices, the feedforward polydyne positioning control input to an actuator that controls a control object, thereby performing positioning control of the control object.

Various illustrative aspects are directed to one or more processing devices comprising means for generating a feedforward polydyne positioning control input. The one or more processing devices further comprise means for outputting the feedforward polydyne positioning control input to an actuator that controls a control object, thereby performing positioning control of the control object.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

FIGS. 3C and 3D show graphs of the gain, in decibels, and the phase, in degrees, respectively for example frequency responses of the control object P and reference model Mr, respectively, discretized with the ZOH including the dead time, in accordance with aspects of the present disclosure.

FIGS. 4A-4C show graphs of the basis polynomial and its differentials: FIG. 4A shows a graph of the basis polynomial $u_0[i]$; FIG. 4B shows a graph of the first order derivative multiplied by the time step $u_0'[i]\tau$ which means the forward differential $\Delta u_0[i] = u_0[i+1] - u_0[i]$; and FIG. 4C shows a graph of the second order derivative multiplied by the square of time step $u_0''[i]\tau^2$ which means the second-order differential $\Delta^2 u_0[i]$, in accordance with aspects of the present disclosure.

FIG. 5A shows a graph of position, in microns, over time, in milliseconds, for the example feedforward inputs, as generated by the nominal model for both seventh-order sampled-data polynomial and polydyne control, in accordance with aspects of the present disclosure.

FIG. 5B shows a graph of force, in micronewtons, over time, in milliseconds, for the example feedforward inputs for both seventh-order sampled-data polynomial control and polydyne control, in accordance with aspects of the present disclosure.

FIG. 5C shows a graph of the position, in microns, after seek motion over time, in milliseconds, for both seventh-order sampled-data polynomial and polydyne control, in accordance with aspects of the present disclosure.

FIGS. 6A-6F show the transient responses associated with the three resonant modes, mode-2, mode-3, and mode-4, in the actuator model, in accordance with aspects of the present disclosure.

FIGS. 7A-7F show graphs of transient response residual vibrations of the mode-2, mode-3, and mode-4 of the actuator model, using different values for the damping ratio of mode-2, in accordance with aspects of the present disclosure.

FIG. 8A-8C show graphs of the position and force, respectively, over time, for a control object under control of a feedforward input used with the eleventh-order sampled-data polydyne in accordance with aspects of this disclosure as in the example of FIGS. 7D-7F in comparison with a conventional method using a seventh-order sampled-data polynomial input, in accordance with aspects of the present disclosure.

FIGS. 9A-9C show graphs of the feedforward input position and force, respectively, over time using eighth and twelfth-order sampled-data polynomials in accordance with aspects of this disclosure compared to the sixth-order sampled-data polynomials.

DETAILED DESCRIPTION

1. Introduction

Figure 1:
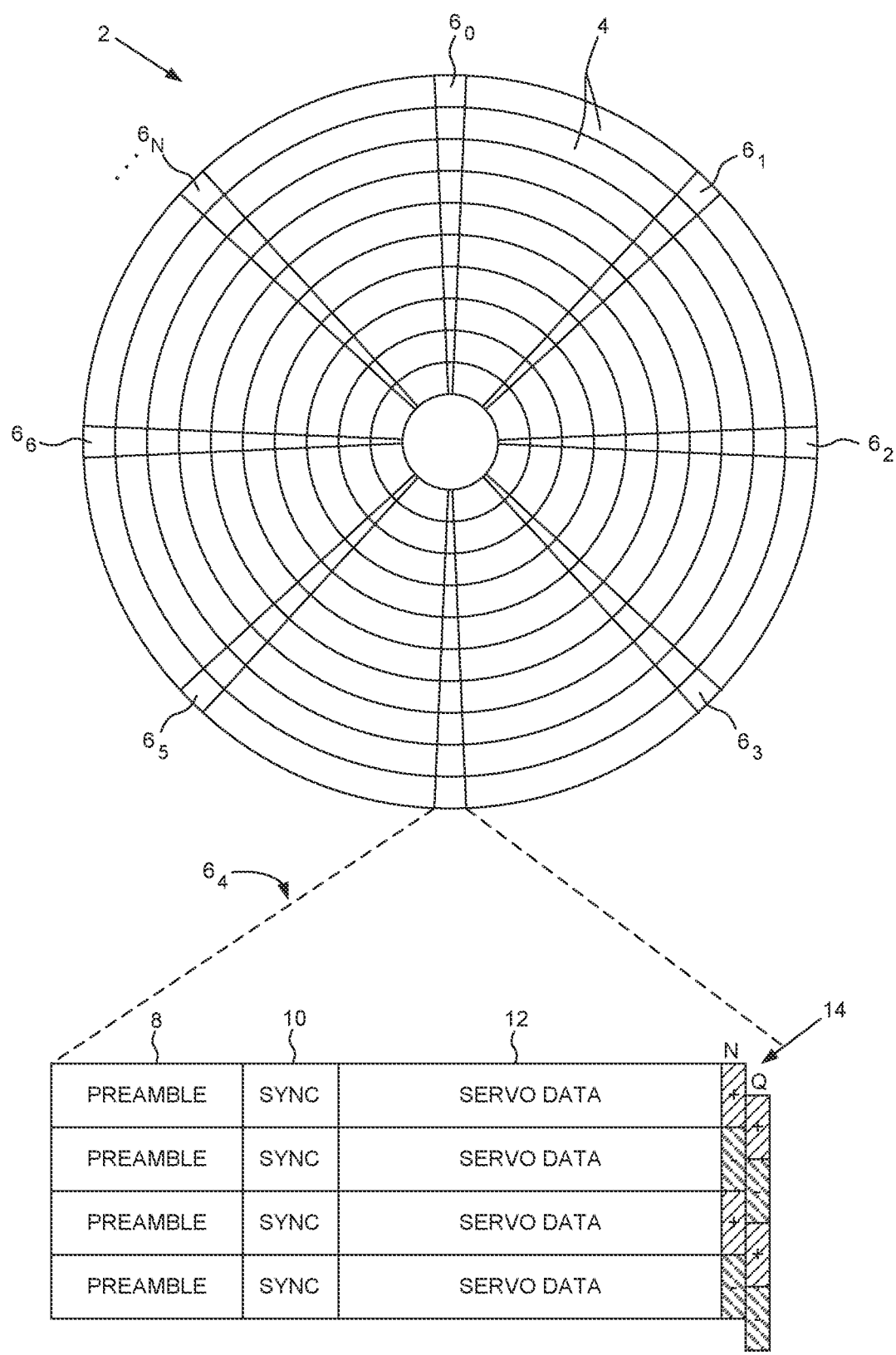
FIG. 1 shows a prior art disk format as comprising a number of radially-spaced, concentric servo tracks defined by servo wedges recorded around the circumference of each servo track.

Example simulation studies in aspects of this disclosure were directed to seek control of a hard disk drive. Example aspects of a hard disk drive in accordance with this disclosure are described as follows. In other examples of this disclosure, the proposed sampled-data polydyne can be applied to any kind of positioning control systems, with applications in a variety of products, including particular applicability in systems that involve or require high-speed and/or high-precision positioning control.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of a primary actuator, e.g., a voice coil motor ("VCM") 20, that rotates and controls actuator assembly 19, in accordance with aspects of the present disclosure, as further described below. For example, control circuitry 22 may control the actuation motions of VCM 20 using sampled-data polydyne feedforward positioning control, in accordance with various aspects of this disclosure, as further described below.

VCM 20 is configured to control actuator assembly 19, which comprises one or more read/write heads 18 ("head 18"), to position the one or more heads 18 over disk surfaces 17 of the one or more disks 16. Heads 18 may each be configured for writing and reading control features and data to and from a corresponding disk surface 17 of hard disks 16. Actuator assembly 19 comprises a number of actuator arms 40 (e.g., topmost actuator arm 40A, as seen in the perspective view of FIGS. 2A and 2B). Each of actuator arms 40 comprises one of heads 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 of the one or more disks 16 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and one or more fine actuators on each actuator arm, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may take the form of one or more processing devices, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices. Such device drivers comprised in control circuitry 22 may comprise one or more actuator drivers such as VCM driver 24, configured for driving and operating VCM 20. VCM driver 24 may control VCM 20 to perform various operations, including primary seek operations of actuator arm assembly 19, as further described below. VCM driver 24 may also control VCM 20 to actuate actuator arm assembly 19 to reduce position error signal (PES) based on servo signals, as further described below.

Example disk drive 15 of FIGS. 2A and 2B comprises four hard disks 16. Other examples may comprise any number of disks, such as just one disk, two disks, three disks, or five, ten, twenty, or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends the heads 18 of each actuator arm 40 over and proximate to a corresponding disk surface 17, enabling each head 18 to write control features and data to, and read control features and data from, its respective, proximate disk surface 17. In this sense, head 18 of each actuator arm 40 interacts with a corresponding disk surface 17. The heads 18 write to and read from their corresponding disk surfaces 17 under the positioning control of VCM 20 under the control of control circuitry 22, in this example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes read signals 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter. Control circuitry 22 generates control signals 38 applied to actuator arm assembly 19, including to control VCM 20, which rotates actuator arm assembly 19 about an axial pivot in order to actuate actuator arm assembly 19 and the corresponding heads 18 radially over the disk surfaces 17 in primary seek operations, and in operations to reduce the PES based on the servo signals.

In the example of FIGS. 2A and 2B, VCM 20 rotates actuator arm assembly 19 and actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks.

In executing example method 80 of FIG. 2C (aspects of which will also be further explained below with reference to the further figures), control circuitry 22 may issue a plurality of commands to other components of disk drive 15, receive information from other components of disk drive 15, and perform operations, such as generating signals for outputting or applying to system components of disk drive 15. In particular, control circuitry 22, and in some examples, VCM driver 24 of control circuitry 22, may generate a feedforward polydyne positioning control input (82), and output the feedforward polydyne positioning control input to an actuator such as VCM 20 (84). In some examples, VCM driver 24 of control circuitry 22 may use sampled-data polydyne as feedforward input for a high-speed and high-precision positioning control system that does not excite specified mechanical resonant modes, such as in seek control for a data storage system such as a hard disk drive. A polydyne curve may be an optimal cam profile that does not generate residual vibrations due to the follower's resonant mode. Novel aspects of the present disclosure comprise the inventive insight that, when the frequency of vibration to be suppressed is high and the sampling frequency is relatively low, generating a reference trajectory for feedforward control, including based on a polydyne, may be performed in discrete-time domain. Aspects of the present disclosure comprise performing a novel derivation of a polydyne curve from the response of a one-degree-of-freedom (1-DOF) vibration system driven by an input force defined as a continuous-time polynomial. Aspects of the present disclosure also comprise, after performing the novel derivation of the polydyne curve from the response of a one-degree-of-freedom (1-DOF) vibration system driven by an input force defined as a continuous-time polynomial, deriving and formulating a sampled-data polydyne in discrete-time domain. Polydyne-based control may be used instead of polynomials; for suppressing one resonant mode, the order of polynomial may be seventh or higher, and for suppressing two modes, the order of polynomial may be eleventh or higher, in various examples.

Aspects of this disclosure were analyzed using a simulation model and code for seek control in a hard disk drive that comprises a feedback controller and plant model. The feedforward inputs for suppressing one and two resonant modes in the system were generated for the simulation of seek control. The results were compared with conventional methods using the sampled-data polynomial, and illustrative advantages of example polydyne feedforward inputs of this disclosure were confirmed.

Simulations of seek control in a hard disk drive in accordance with aspects of the present disclosure have been performed and have successfully demonstrated using feedforward input using sampled-data polydyne in accordance with aspects of this disclosure suppressed residual vibration of control objects. The simulation results were compared with a typical prior art conventional method using sampled-data polynomial. Seventh and eleventh-order polydyne were compared with the seventh-order sampled-data polynomial. In cases of even order polynomial, on the other hand, the eighth and twelfth-order polydyne were compared with the sixth-order polynomial. In both cases, it has been confirmed that the sampled-data polydyne suppressed the residual vibrations substantially and improved the tracking error after seek motion, relative to the known techniques of the prior art, among other advantages. In further aspects of the present disclosure, example systems, devices and methods used the damping ratio of the closed-loop system in generating the sampled-data polydyne, instead of that of the control object, and novel advantages of this were also confirmed.

2. Sampled-Data Polydyne

2.1 Novel Derivation of Polydyne Curve

Consider a 1-DOF vibration system driven by an input force f(t) which is defined at $0 \leq t \leq T$ and zero at the other times. When the natural frequency and damping ratio of the system are denoted by $\omega_n$ and $\zeta$, the equation of motion may be expressed as follows without loss of generality, and its residual vibration may be given as:

$$\frac{d^2x}{dt^2}(t) + 2\zeta\omega_n \frac{dx}{dt}(t) + \omega_n^2 x(t) = f(t). \tag{Equation 1}$$

The solution of this equation may be obtained by Duhamel's integral, $$x(t) = \frac{1}{\sqrt{1-\zeta^2}\,\omega_n} \int_0^t f(\tau) e^{-\zeta\omega_n(t-\tau)} \sin\left(\sqrt{1-\zeta^2}\,\omega_n(t-\tau)\right) d\tau, \tag{Equation 2}$$

and it may be rearranged using a complex exponential function, $$x(t) = \frac{1}{\omega_d} \Im\left[\int_0^t f(\tau) e^{\lambda(t-\tau)} d\tau\right], \tag{Equation 3}$$

while $\Im[]$ denotes an imaginary part of a term in the bracket, and $$\lambda = (-\zeta + j\sqrt{1-\zeta^2})\omega_n, \tag{Equation 4}$$

$$\omega_d = \sqrt{1-\zeta^2}\,\omega_n. \tag{Equation 5}$$

If the input f(t) is the nth-order polynomial, the integral in Eq. (3) may be arranged as follows by applying the integral by part repeatedly, $$\int_0^t f(\tau) e^{\lambda(t-\tau)} d\tau = \tag{Equation 6}$$

$$\left[\lambda^{-1} f(\tau) e^{\lambda(t-\tau)}\right]_0^t - \int_0^t \lambda^{-1} f'(\tau) e^{\lambda(t-\tau)} d\tau = \left[-\lambda^{-1} f(\tau) e^{\lambda(t-\tau)}\right]_0^t -$$

$$\left[(-\lambda)^{-2} f'(\tau) e^{\lambda(t-\tau)}\right]_0^t + \int_0^t (-\lambda)^{-2} f''(\tau) e^{\lambda(t-\tau)} d\tau =$$

$$\sum_{k=0}^{n} \left(-\lambda^{-(k+1)} f^{(k)}(t) + \lambda^{-(k+1)} f^{(k)}(0) e^{\lambda t}\right),$$

while $f^{(k)}(t)$ stands for k-th order derivative of f(t). At last, the transient vibrations may be obtained at $0 \leq t \leq T$, $$x(t) = \frac{1}{\omega_d} \Im\left[\sum_{k=0}^{n} \left(-\lambda^{-(k+1)} f^{(k)}(t) + \lambda^{-(k+1)} f^{(k)}(0) e^{\lambda t}\right)\right], \tag{Equation 7}$$

and at t>T, $$x(t) = \frac{1}{\omega_d} \Im\left[\sum_{k=0}^{n} \left(\lambda^{-(k+1)} f^{(k)}(0) e^{\lambda t} - \lambda^{-(k+1)} f^{(k)}(T) e^{\lambda(t-T)}\right)\right]. \tag{Equation 8}$$

The conditions of the residual vibration expressed by Eq. (8) are $$\sum_{k=0}^{n} \lambda^{-(k+1)} f^{(k)}(0) = 0, \tag{Equation 9}$$

and $$\sum_{k=0}^{n} \lambda^{-(k+1)} f^{(k)}(T) = 0. \tag{Equation 10}$$

Here, let $f_0(t)$ be a polynomial of the time t and satisfy the following conditions, $$f_0(0) = f'_0(0) = f_0(T) = f'_0(T) = 0 \tag{Equation 11}$$

and the feedforward input f(t) may be defined by using real constants α and β as follows, $$f(t) = f_0(t) + \alpha f'_0(t) + \beta f''_0(t). \tag{Equation 12}$$

Substituting it for Eq. (9), the following equation may be obtained, $$\sum_{k=0}^{n} \lambda^{-(k+1)}(1 + \alpha\lambda + \beta\lambda^2) f_0^{(k)}(0) = 0. \quad \text{(Equation 13)}$$

A similar equation may be obtained from Eq. (10), and α and β may satisfy the following equation, $$1+\alpha\lambda+\beta\lambda^2=0$$

Since the α and β are real constants, the solution is given as follows, $$\alpha=\zeta\omega_n^{-1},$$

$$\beta=\omega_n^{-2}. \quad \text{(Equations 15)}$$

and Eqs. (11), (12), and (15) are consistent with the definition of a polydyne curve.

2.2 Transient Vibration Caused by Dampled-Data Input

Figure 3A:
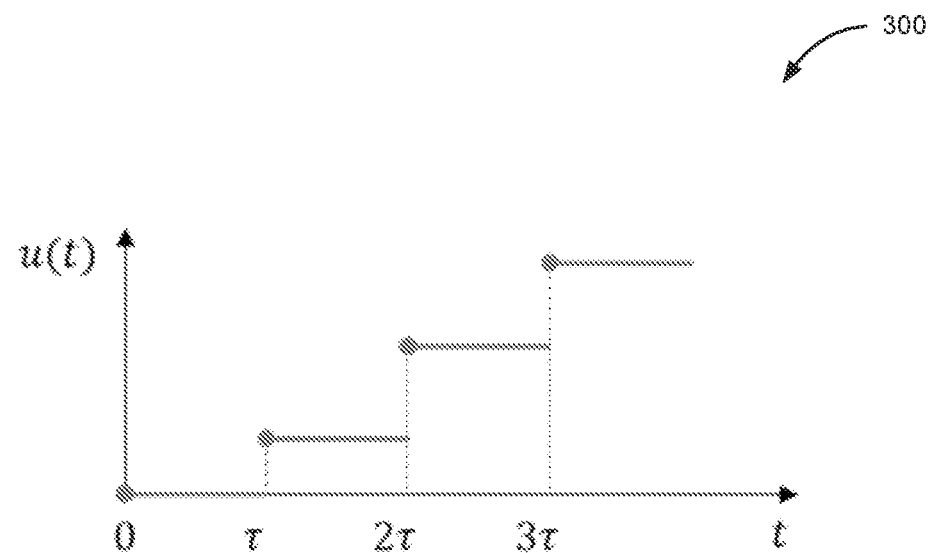
FIG. 3A shows an example conceptual graph of a feedforward input polynomial on the y-axis, which is shaped stepwise by zeroth-order hold, over stepped time on the x-axis, where the time step is $\tau$, in accordance with aspects of the present disclosure.

A sampled-data control system like a hard disk drive may have a zeroth-order hold (ZOH) and an input to a control object may be discretized and change in steps, as shown in FIG. 3A. FIG. 3A shows an example conceptual graph 300 of a feedforward input polynomial on the y-axis, which is shaped stepwise by zeroth-order hold, over stepped time on the x-axis, where the time step is τ, in accordance with aspects of the present disclosure. The feedforward input in the sampled-data control system is discretized with ZOH and changes in steps.

Let u[i] denote a value of input at step i and be an nth order polynomial of i. Substituting it for the input f in Eq. (8), the residual vibration at t>Nτ may be written as follows, $$x(t) = \frac{1}{\omega_d} \Im\left[\sum_{i=0}^{N-1} \lambda^{-1} u[i] e^{\lambda(t-i\tau)}(1-e^{-\lambda\tau})\right], \quad \text{(Equation 16)}$$

$$= \frac{1}{\omega_d} \Im[\lambda^{-1} \xi e^{\lambda t}].$$

while T stands for the time step, N is the move time (number of steps), and ξ is defined as, $$\xi = \sum_{i=0}^{N-1} u[i] e^{-i\lambda\tau}(1-e^{-\lambda\tau}). \quad \text{(Equation 17)}$$

While the differential Δu may be defined as $$\Delta^0 u\ [i]=u\ [i], \quad \text{(Equation 18)}$$

$$\Delta^k u\ [i]=\Delta^{k-1} u\ [i+1]-\Delta^{k-1} u\ [i] \quad \text{(Equation 19)}$$

ξ may be arranged as, $$\xi = u[0] - u[N]e^{-N\lambda\tau} + e^{-\lambda\tau}\sum_{i=0}^{N-1} \Delta u[i] e^{-i\lambda\tau}. \quad \text{(Equation 20)}$$

Moreover, repeating the transformation like the integral by part in the continuous-time system, $$e^{-\lambda\tau}\sum_{i=0}^{N-1} \Delta u[i] e^{-i\lambda\tau} = (e^{\lambda\tau}-1)^{-1}\sum_{i=0}^{N-1} \Delta u[i] e^{-i\lambda\tau}(1-e^{-\lambda\tau}),$$

$$= (e^{\lambda\tau}-1)^{-1}\left((\Delta u[0] - \Delta u[N] e^{-n\lambda\tau}) + \sum_{i=0}^{N-1} \Delta^2 u[i] e^{-(i+1)\lambda\tau}\right),$$

$$= \sum_{k=0}^{n} (e^{\lambda\tau}-1)^{-k}(\Delta^k u[0] - \Delta^k u[N]e^{-N\lambda\tau}) +$$

$$(e^{\lambda\tau}-1)^{-n} e^{-\lambda\tau}\sum_{i=0}^{N-1} \Delta^{n+1} u[i] e^{-i\lambda\tau},$$

(Equation 21)
then the following equation may be obtained, $$\xi = \sum_{k=0}^{n} (e^{\lambda\tau}-1)^{-k}(\Delta^k u[0] - \Delta^k u[N]e^{-N\lambda\tau}), \quad \text{(Equation 22)}$$

since the order of polynomial u[i] is n and its (n+1)-th order differential $\Delta^{n+1}$u[i] is zero.

2.3 Definition of Sampled-Data Polydyne

An example sampled-data polydyne may be derived from a sampled-data polynomial by imposing on it conditions to avoid generating residual vibrations. From Eqs. (16) and (22), the condition to avoid generating residual vibrations are $$\sum_{k=0}^{n} (e^{\lambda\tau}-1)^{-k} \Delta^k u[0] = 0, \quad \text{(Equation 23)}$$

and $$\sum_{k=0}^{n} (e^{\lambda\tau}-1)^{-k} \Delta^k u[n] = 0. \quad \text{(Equation 24)}$$

Here, let derivatives in a sampled-data system be defined as $$u^{(k)}[i]=\Delta^k u\ [i]\tau^{-k}. \quad \text{(Equation 25)}$$

Assume a basis polynomial $u_0$[i] satisfies the conditions $$u_0[0]=u'_0[0]=[0]=u_0[N]=u'_0[N]=0. \quad \text{(Equation 26)}$$

and the polydyne feedforward input u[i] for suppressing one mode may be formulated and defined, using real constants α and β, as, $$u[i]=u_0[i]+\alpha u'_0[i]+\beta u''_0[i]. \quad \text{(Equation 27)}$$

Substituting it for Eq. (23), the following equation may be obtained, $$\sum_{k=2}^{n} (e^{\lambda\Delta\tau}-1)^{-k}(1 + \alpha(e^{\lambda\tau}-1)\tau^{-1} + \beta(e^{\lambda\tau}-1)^2\tau^{-2})\Delta^k u[n] = 0. \quad \text{(Equation 28)}$$

A similar equation may be obtained from Eq. (24) and the condition for α and β to satisfy may be written as $$1+\alpha(e^{\lambda\tau}-1)\tau^{-1}+\beta(e^{80\ \tau}-1)^2\tau^{-2}=0. \quad \text{(Equation 29)}$$

Thus, the constants may be obtained as $$\alpha = \left(\frac{i_1}{i_2}r_2 - r_1\right)^{-1}, \quad \text{(Equation 30)}$$

$$\beta = \left(\frac{i_2}{i_1}r_1 - r_2\right)^{-1},$$

while $r_1 = \Re[(e^{\lambda\tau}-1)\tau^{-1}], i_1 = \Im[(e^{\lambda\tau}-1)\tau^{-1}], r_2 = \Re[(e^{\lambda\tau}-1)^2\tau^{-2}], i_2 = \Im[(e^{\lambda\tau}-1)^2\tau^{-2}],$ (Equation 31)

and $\Re[]$ and $\Im[]$ denote a real and imaginary part of a term in the bracket. When $(e^{\lambda\tau}-1)\tau^{-1}$ equals to $\lambda$, $\alpha$ and $\beta$ are consistent to the ones in the continuous-time system.

In an analogous way, aspects of this disclosure comprise formulating a feedforward input that does not excite two resonant modes. When the natural frequencies and damping ratios of the two modes denoted by $\omega_1$, $\omega_2$, and $\zeta_1$, $\zeta_2$, respectively, the complex natural frequencies may be given by $\lambda_1 = (-\zeta_1 + j\sqrt{1-\zeta_1^2})\omega_1,$ $\lambda_2 = (-\zeta_2 + j\sqrt{1-\zeta_2^2})\omega_2,$ (Equation 32)

While a basis polynomial $u_0[0]$ satisfies the following conditions, $u_0[0] = u'_0[0] = u''_0[0] = u'''_0[0] = u_0[N] = u''_0[N] = u''_0[N] = u'''_0[N] = 0,$ (Equation 33)

the polydyne feedforward input $u[i]$ for suppressing two modes may be formulated as $u[i] = u_0[i] + (\alpha_1 + \alpha_2)u'_0[i] + (\beta_1 + \alpha_1\alpha_2 + \beta_2)u''_0[i] + (\alpha_1\beta_2 + \alpha_2\beta_1)u'''_0[i] + \beta_1\beta_2u''''_0[i].$ (Equation 34)

The real constants $\alpha_1$, $\alpha_2$, $\beta_1$, and $\beta_2$, may be given by $$\alpha_1 = \left(\frac{i_{11}}{i_{21}}r_{21} - r_{11}\right)^{-1}, \quad \text{(Equation 35)}$$

$$\beta_1 = \left(\frac{i_{21}}{i_{11}}r_{11} - r_{21}\right)^{-1},$$

$$\alpha_2 = \left(\frac{i_{12}}{i_{22}}r_{22} - r_{12}\right)^{-1},$$

$$\beta_2 = \left(\frac{i_{22}}{i_{12}}r_{12} - r_{22}\right)^{-1},$$

while $r_{11} = \Re[(e^{\lambda_1\tau}-1)\tau^{-1}], i_{11} = \Im[(e^{\lambda_1\tau}-1)\tau^{-1}], r_{21} = \Re[(e^{\lambda_1\tau}-1)^2\tau^{-2}], i_{21} = \Im[(e^{\lambda_1\tau}-1)^2\tau^{-2}],$ $r_{12} = \Re[(e^{\lambda_2\tau}-1)\tau^{-1}], i_{12} = \Im[(e^{\lambda_2\tau}-1)\tau^{-1}], r_{22} = \Re[(e^{\lambda_2\tau}-1)^2\tau^{-2}], i_{22} = \Im[(e^{\lambda_2\tau}-1)^2\tau^{-2}].$ (Equation 36)

Thus, the polydyne feedforward input $u[i]$ may be completely defined as presented herein, in illustrative aspects of this disclosure.

3. Simulations of Feedforward Control With Sampled-Data Polydyne

3.1 TDOF Control System With Sampled-Data Polydyne

Figure 3B:
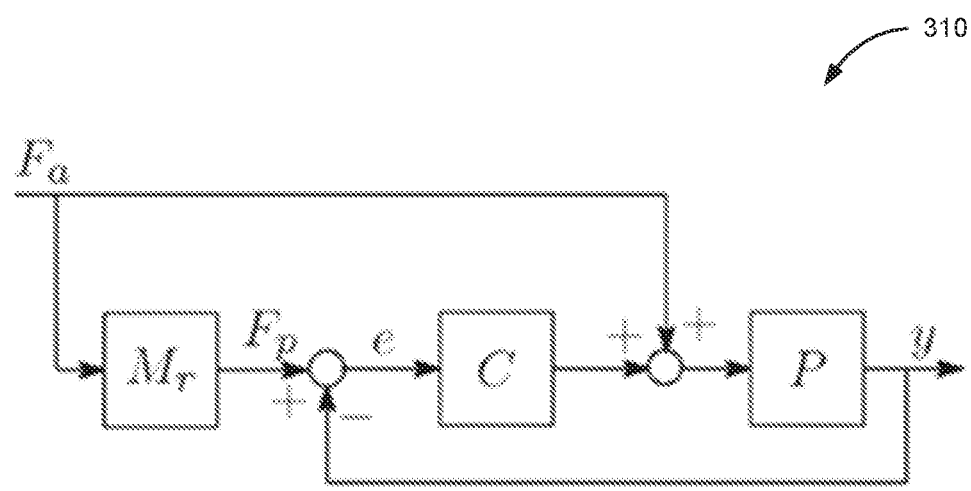
FIG. 3B shows a block diagram of a two degree-of-freedom (TDOF) positioning control system, such as an actuator controlling a control object, using a sampled-data polynomial, used in an example simulation study, in accordance with aspects of the present disclosure.

Aspects of this disclosure use example simulation methods. FIG. 3B shows a block diagram 310 of a two degree-of-freedom (TDOF) positioning control system, such as an actuator controlling a control object, using a sampled-data polynomial, used in an example simulation study, in accordance with aspects of the present disclosure. Acceleration feedforward $F_\alpha$ may be given as a sampled-data polynomial and the position feedforward input may be generated by the reference model $M_r$. The mechanical model of an actuator may be mathematically modeled as $$P_m(s) = K_p \sum_{i=1}^{4} \frac{\alpha_i}{s^2 + 2\zeta_i\omega_i s + \omega_i^2}. \quad \text{(Equation 37)}$$

while $K_p = 100$, and the modal parameters are listed in Table 1. The control object P may be calculated by the discretization of $P_m$ with the ZOH and the corresponding time delay. In this section, the time step was 0.05 milliseconds (ms) and the dead time was 0.025 ms. The frequency responses of the discrete-time systems P and $M_r$ are shown in FIGS. 3C and 3D. FIGS. 3C and 3D show graphs 320 and 330 of the gain 322, 324, in decibels, and the phase 332, 334, in degrees, respectively, for example frequency responses of the control object P and reference model Mr, respectively, discretized with the ZOH including the dead time, where the time step was 0.05 ms and the dead time was 0.025 ms, in accordance with aspects of the present disclosure.

TABLE 1

| Parameters of the actuator model | | | |
|---|---|---|---|
| Mode# i | Frequency $\omega_i$ | Damping $\zeta_i$ | Gain $\alpha_i$ |
| 1 | 0 | 0 | 1 |
| 2 | $2\pi \times 4000$ | 0.03 | −1 |
| 3 | $2\pi \times 6000$ | 0.005 | 0.2 |
| 4 | $2\pi \times 7000$ | 0.005 | 0.3 |

An example sampled-data polynomial may have boundary conditions for the derivatives of the positioning input $u[i]$ to a control object, but they are not consistent to Eqs. (26) and (33). To obtain a basis polynomial $u_0[i]$ for a sampled-data polydyne, in accordance with aspects of the present disclosure, the boundary conditions for the derivatives of the positioning input $u[i]$ to a control object were replaced with conditions for derivatives in an example sampled-data system as defined in Eq. (25). Thus, the basis polynomial of acceleration trajectory for a sampled-data polydyne used in this simulation may satisfy the following boundary conditions: The conditions in the velocity $v[i]$ and position $p[i]$ are the same as of the sampled-data polynomial, $v[0] = p[0] = 0,$ (Equation 38)

$$v[N] = \tau \sum_{i=1}^{N-1} u_0[i] = 0, \quad \text{(Equation 39)}$$

$$p[N] = \frac{1}{2}\tau^2 \sum_{i=1}^{N-1}(2(N-i)-1)u_0[i] = P_t, \quad \text{(Equation 40)}$$

and the acceleration and derivatives satisfy the following conditions, $u_0[1] = u'_0[1] = \ldots = u_0^{(M-1)} = 0$ $u_0[N] = u'_0[N] = \ldots = u_0^{(M+L-1)}[N] = 0$ (Equation 41)

where $\tau$ is the time step, N is the seek time (number of steps), $P_t$ is the target seek length, and M and L are integers to be defined according to the order of polynomial. Although the acceleration trajectories from the boundary conditions may be derived arithmetically, the coefficients of the basis polynomial were obtained by solving the simultaneous equations numerically in the example in this section. Let the basis polynomial $u_0[i]$ be defined as follows, $$u_0[i] = \left(\frac{i}{N_{ML}}\right)\left(\frac{i}{N_{ML}} - 1\right) \sum_{r=0}^{2M+L+1} a_r \left(\frac{i}{N_{ML}} - t_m\right)^r. \quad \text{(Equation 42)}$$

The conditions in the velocity and position at final step may be written as, $$v[N] = \sum_{r=0}^{2M+L+1} a_r \sum_{i=1}^{N} \left(\frac{i}{N_{ML}}\right)\left(\frac{i}{N_{ML}} - 1\right)\left(\frac{i}{N_{ML}} - t_m\right)^r = 0, \quad \text{(Equation 43)}$$

$$p[N] =$$

$$\sum_{r=0}^{2M+L+1} a_r \sum_{i=1}^{N} \left(\frac{i}{N_{ML}}\right)^2 \left(\frac{i}{N_{ML}} - 1\right)\left(\frac{i}{N_{ML}} - t_m\right)^r = -\frac{P_t}{N_{ML}\tau^2}. \quad \text{(Equation 44)}$$

The conditions in the derivatives at the initial step may be written as follows, $$u_0[1] = \sum_{r=0}^{2M+L+1} a_r \left(\frac{1}{N_{ML}}\right)\left(\frac{1}{N_{ML}} - 1\right)\left(\frac{1}{N_{ML}} - t_m\right)^r = 0, \quad \text{(Equation 45)}$$

$$\vdots$$

$$u_0[M] = \sum_{r=0}^{2M+L+1} a_r \left(\frac{M}{N_{ML}}\right)\left(\frac{M}{N_{ML}} - 1\right)\left(\frac{M}{N_{ML}} - t_m\right)^r = 0,$$

and the conditions in the derivatives at the final step may be $$u_0[N] = \sum_{r=0}^{2M+L+1} a_r \left(\frac{N}{N_{ML}}\right)\left(\frac{N}{N_{ML}} - 1\right)\left(\frac{N}{N_{ML}} - t_m\right)^r = 0, \quad \text{(Equation 46)}$$

$$\vdots$$

$$u_0[N_{ML} - 1] = \sum_{r=0}^{2M+L+1} a_r \left(\frac{N_{ML} - 1}{N_{ML}}\right)\left(\frac{N_{ML} - 1}{N_{ML}} - 1\right)\left(\frac{N_{ML} - 1}{N_{ML}} - t_m\right)^r = 0,$$

where $\alpha_r$ are the coefficients of the basis polynomial, M is the number of boundary conditions at the initial step, M+L is the number of boundary conditions at the final step, and $N_{ML}$=N+M+L. The order of the polynomial is 2M+L+3. $t_m$, can be an arbitrary real constant and $t_m$=0.5 is used herein.

The minimal order of the sampled-data polynomial to suppress one mode is seven, where M=2 and L=0. Here the acceleration trajectory was generated as the seventh-order sampled-data polydyne, while the seek length $P_t$=1×10⁻⁵, seek time T=0.9 ms, time step $\tau$=0.05 ms, and N=18. The natural frequency and damping ratio of the suppressed mode are 6,000 Hz and 0.005. The values of coefficients $\alpha_r$, calculated from Eqs. (42) to (46) are listed in Table 2.

TABLE 2

Values of parameters of sampled-data polydyne used in the simulations (values of coefficients $a_r$ calculated from Eqs. (42) to (46); parameters of the sampled-data polydyne control inputs shown in FIGS. 5A-B, 8A-B, and 9A-B, below)

| Parameters | 7$^{th}$ order polydyne | 8$^{th}$ order polydyne | 11$^{th}$ order polydyne | 12$^{th}$ order polydyne |
|---|---|---|---|---|
| $\omega_1$ | 2π × 6000 | 2π × 6000 | 2π × 6000 | 2π × 6000 |
| $\zeta_1$ | 0.005 | 0.005 | 0.005 | 0.005 |
| $\omega_2$ | — | — | 2π × 4000 | 2π × 4000 |
| $\zeta_2$ | — | — | 0.1 | 0.1 |
| N | 18 | 18 | 18 | 18 |
| M | 2 | 2 | 4 | 4 |
| L | 0 | 1 | 0 | 1 |
| $t_m$ | 0.5 | 0.5 | 0.5 | 0.5 |
| $a_0$ | 0 | 3.011 × 10² | 0 | 4.298 × 10² |
| $a_1$ | 4.632 × 10³ | 4.105 × 10³ | 1.0033 × 10⁴ | 8.760 × 10³ |
| $a_2$ | 0 | −1.716 × 10⁴ | 0 | −4.815 × 10⁴ |
| $a_3$ | −5.182 × 10⁴ | −4.512 × 10⁴ | −2.835 × 10⁵ | −2.399 × 10⁵ |
| $a_4$ | 0 | 1.613 × 10⁵ | 0 | 1.115 × 10⁶ |
| $a_5$ | 1.430 × 10⁵ | 1.224 × 10⁵ | 2.932 × 10⁶ | 2.412 × 10⁶ |
| $a_6$ | — | −4.133 × 10⁵ | 0 | −1.053 × 10⁷ |
| $a_7$ | — | — | −1.317 × 10⁷ | −1.055 × 10⁷ |
| $a_8$ | — | — | 0 | 4.465 × 10⁷ |
| $a_9$ | — | — | 2.167 × 10⁷ | 1.170 × 10⁷ |
| $a_{10}$ | — | — | — | −7.045 × 10⁷ |

FIGS. 4A-4C show graphs of the basis polynomial and its differentials: FIG. 4A shows a graph 410 of the basis polynomial $u_0[i]$; FIG. 4B shows a graph 420 of the first order derivative multiplied by the time step $u_0'[i]\tau$ which means the forward differential $\Delta u_0[i]=u_0[i+1]-u_0[i]$; and FIG. 4C shows a graph 430 of the second order derivative multiplied by the square of time step $u_0'[i]\tau^2$ which means the second-order differential $\Delta^2 u_0[i]$, in accordance with aspects of the present disclosure. The length of basis polynomial and first and second-order derivatives are N+2, N+1, and N, respectively.

FIG. 4A shows the seventh-order polynomial $u_0[i]$ expressed as in Eq. (42) and satisfies the conditions in Eqs. (42) to (46). FIG. 4B shows the first derivative $u_0'[i]$ multiplied by the time step $\tau$ which means the forward differential $\Delta u[i]$. FIG. 4C shows the second derivative $u_0[i]$ multiplied by the square of time step $\tau^2$. The length of the first and second derivatives are shorter by one and two steps, respectively, than the basis polynomial.

Figure 4D:
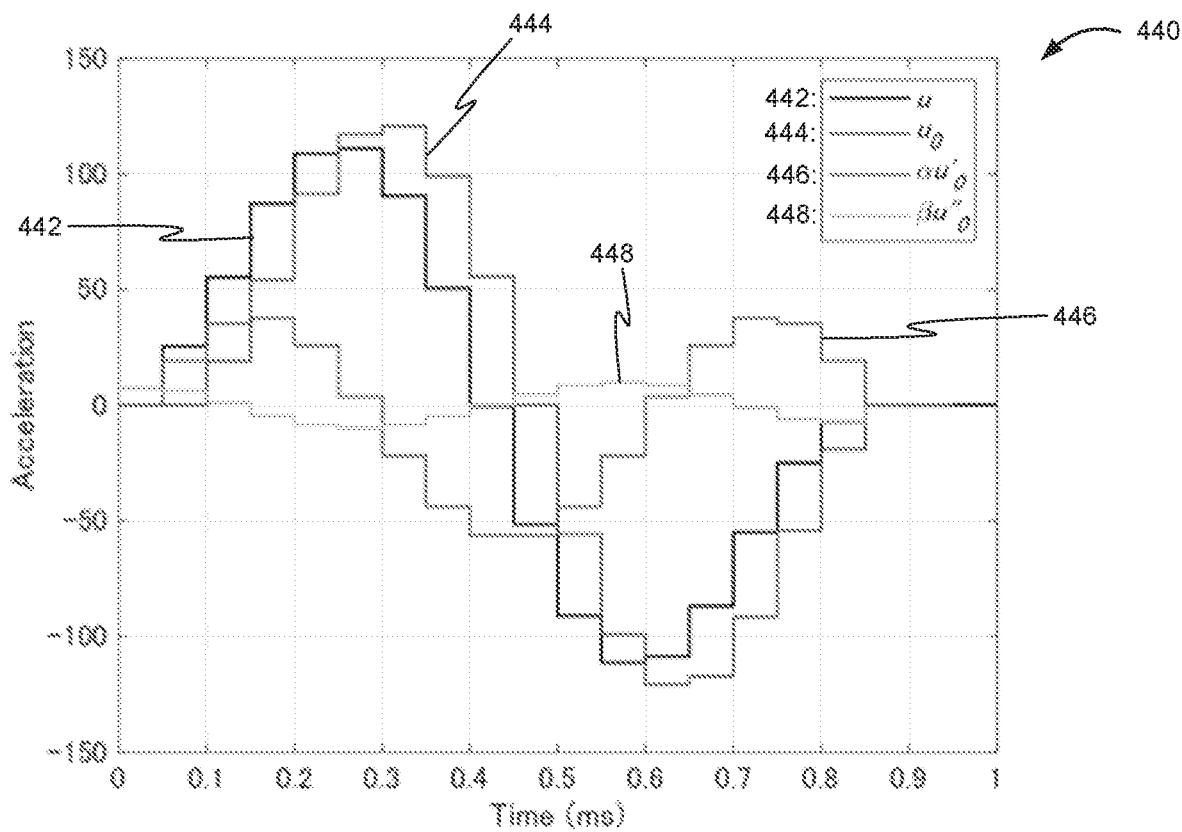
FIG. 4D shows a graph of the generated acceleration trajectory of an example seventh-order sampled-data polydyne and its components, as written in the right-hand side of Eq. (27), in accordance with aspects of this disclosure.

FIG. 4D shows a graph 440 of the generated acceleration trajectory of an example seventh-order sampled-data polydyne and its components, as written in the right-hand side of Eq. (27), in accordance with aspects of this disclosure. In graph 440 of FIG. 4D, curve 442 indicates the acceleration trajectory u of an example seventh-order sampled-data polydyne. The three component terms of u as in the right-hand side of Eq. (27), i.e. $u_0$, $\alpha u_0'$, and $\beta u_0''$, are plotted in graph 440 as curves 444, 446, and 448, respectively. (The alternative ordering shown between the single and double prime superscripts and the naught subscript in these terms in the legend in FIG. 4D are merely an orthographic artifact; the terms are identical to those as shown herein.)

Figure 4E:
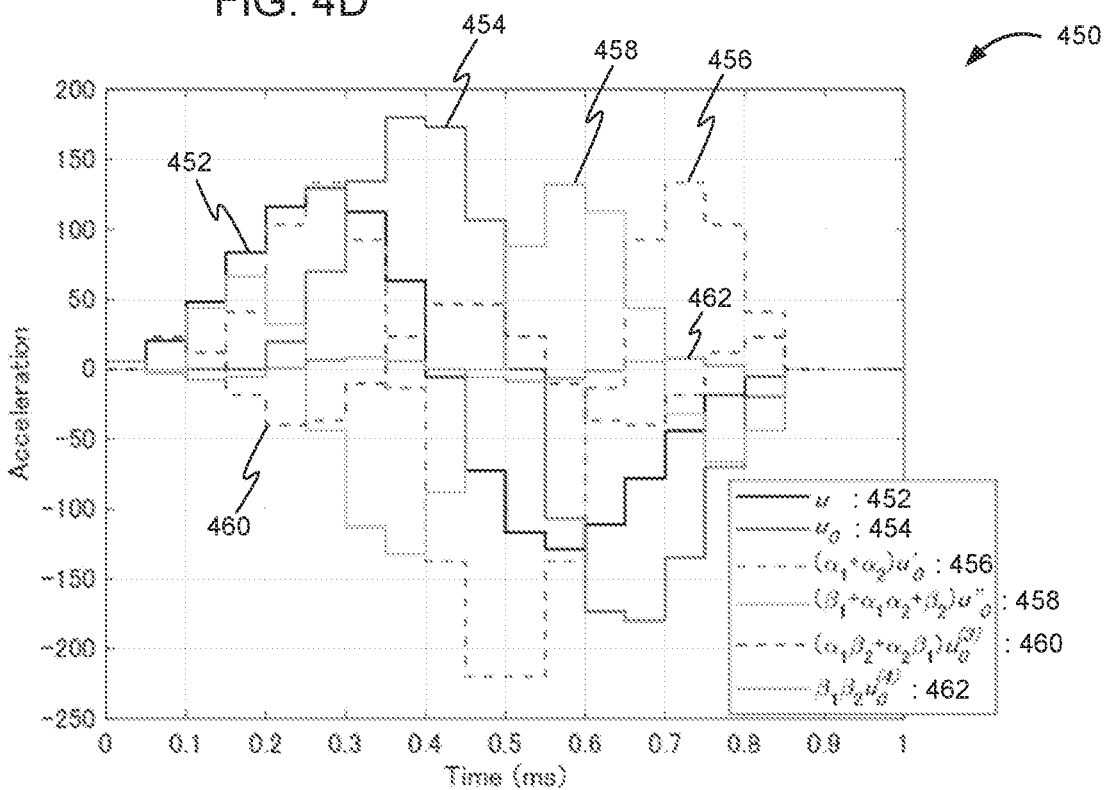
FIG. 4E shows a graph of the acceleration trajectory of eleventh order sampled-data polydyne while $Pt=1\times10^{-5}$, $T=0.9$ ms, $\tau=0.05$ ms, $N=18$, the natural frequency and damping ratio are 6,000 Hz and 0.005, and 7,000 Hz and 0.005, respectively, in accordance with aspects of this disclosure.

On the other hand, the minimal order of the polynomial for two modes is eleven, where M=4 and L=0. FIG. 4E shows a graph 450 of the acceleration trajectory of eleventh order sampled-data polydyne while Pt=1×10⁻⁵, T=0.9 ms, $\tau$=0.05 ms, N=18, the natural frequency and damping ratio are 6,000 Hz and 0.005, and 7,000 Hz and 0.005, respectively, in accordance with aspects of this disclosure. The values of coefficients $a_r$ are also listed in Table 2. The basis polynomial and components in the right hand of Eq. (34) are also plotted in FIG. 4E. Graph 450 shows the acceleration trajectory 452 of this example eleventh-order sampled-data polydyne. The five terms on the right hand side of Eq. (34), i.e. $u_0$, $(\alpha_1+\alpha_2)u_0'$, $(\beta_1+\alpha_1\alpha_2+\beta_2)u_0'''$, $(\alpha_2\beta_1+\alpha_1\beta_2)u_0'''$, and $\beta_1\beta_2u_0''''$, are plotted in graph 450 as curves 454, 456, 458, 460, and 462, respectively. (Again, slightly different and obviously equivalent notation is used in the legend in graph 450.)

3.2 Seventh-order Sampled-Data Polydyne to Suppress a Resonant Mode

To compare an example sampled-data polydyne of this disclosure with a prior art conventional method using a sampled-data polynomial, hard disk drive seek control simulations were performed. The acceleration trajectory of seventh-order sampled-data polydyne was designed to suppress the mode-3 in Table 1.

FIGS. 5A-5C show a comparison of sampled-data polynomial and sampled-data polydyne control, in accordance with aspects of the present disclosure. FIG. 5A shows a graph 510 of position, in microns, over time, in milliseconds, for the example feedforward inputs, as generated by the nominal model for both seventh-order sampled-data polynomial and polydyne control, which are not separately labeled because they overlap with each other to the point of being indistinguishable, at least on the scale of graph 510, in accordance with aspects of the present disclosure. FIG. 5B shows a graph 520 of force, in newtons, over time, in milliseconds, for the example feedforward inputs for both seventh-order sampled-data polynomial control 522 and polydyne control 554, which are barely distinguishable on the scale of graph 520, in accordance with aspects of the present disclosure. That is, FIG. 5B shows the feedforward input forces of the seventh-order sampled-data polynomial and polydyne control. FIG. 5C shows a graph 530 of the position, in microns, after seek motion over time, in milliseconds, for both seventh-order sampled-data polynomial and polydyne control, which are not separately labeled because they overlap with each other to the point of being indistinguishable, at least on the scale of graph 530, in accordance with aspects of the present disclosure. As shown, the differences in positions and forces between the polynomial and polydyne are very small. These results show that there was little if any difference in position or force over time between the sampled-data polynomial and polydyne inputs, even while polydyne inputs in various aspects of this disclosure may achieve substantial improvements in residual vibration error and other novel advantages.

FIGS. 6A-6F show the transient responses associated with the three resonant modes, mode-2, mode-3, and mode-4, in the actuator model. FIGS. 6A and 6D show vibrations in hundredths of microns, over time, in milliseconds; FIGS. 6B, 6C, 6E, and 6F show vibrations in nanometers, over time, in milliseconds. FIGS. 6A-6C show graphs 610, 620, and 630 of simulation results with the seventh-order sampled-data polynomial input in mode-2, mode-3, and mode-4, respectively, and FIGS. 6D-6F show graphs 640, 650, and 660 of simulation results with the seventh-order sampled-data polydyne input in mode-2, mode-3, and mode-4, respectively, in accordance with aspects of the present disclosure. The sampled-data polydyne input substantially suppressed the vibration of mode-3, as shown in graph 650, compared with mode-3 with the polynomial input, as shown in graph 620. The sampled-data polydyne input also improved the suppression of the vibrations of mode-2 and mode-4, as shown in graphs 640 and 660, respectively, relative to those with the polynomial input, in graphs 610 and 630, respectively.

3.3 Eleventh-Order Sampled-Data Polydyne to Suppress Two Resonant Modes

In this section, the acceleration trajectory of eleventh-order sampled-data polydyne was designed to suppress the mode-2 and mode-3, as shown in Table 1. FIGS. 7A-7F show graphs of transient response residual vibrations of the mode-2, mode-3, and mode-4 of the actuator model, using different values for the damping ratio of mode-2, in accordance with aspects of the present disclosure. FIGS. 7A and 7D show vibrations in hundredths of microns, over time, in milliseconds; FIGS. 7B, 7C, 7E, and 7F show vibrations in nanometers, over time, in milliseconds. FIGS. 7A-7C show graphs 710, 720, and 730 of the eleventh-order sampled-data polydyne with the value of the damping ratio of mode-2 of $\zeta_2=0.03$, as in the actuator model in Table 1, for mode-2, mode-3, and mode-4, respectively. FIGS. 7D-7F show graphs 740, 750, and 760 of the eleventh-order sampled-data polydyne with the value of the damping ratio of mode-2 of $\zeta_2=0.1$, for mode-2, mode-3, and mode-4, respectively. It is found that the residual vibration of mode-2 as in the graphs of FIGS. 7D-7F are smaller and better suppressed than those as in the graphs of FIGS. 7A-7C. In accordance with aspects of this disclosure, this indicates the advantages of using the damping ratio of the closed-loop system instead of the mechanical one in generating acceleration trajectory of the sampled-data polydyne.

FIGS. 8A and 8B show graphs 810 and 820 of the position (in microns) and force (in newtons), respectively, over time (in milliseconds) for a control object under control of a feedforward input used with the eleventh-order sampled-data polydyne in accordance with aspects of this disclosure as in the example of FIGS. 7D-7F, in comparison with a conventional method using a seventh-order sampled-data polynomial input. Graph 810 shows polynomial input position 812 over time and polydyne input position 814 over time. Graph 820 shows polynomial input force 822 over time and polydyne input force 824 over time. FIG. 8C shows a graph 830 of the tracking errors of position (in microns) over time (in milliseconds) after finishing the seek motion (e.g., t≥0.9 ms) of the control object (e.g., the head of a disk drive), using the example polydyne method and the example conventional polynomial method. Graph 830 shows polydyne input position tracking error 834 over time and polynomial input position tracking error 832 over time. It is shown that the eleventh-order polydyne input method in accordance with aspects of this disclosure improves the tracking error after seek motion (e.g., t 0.9 ms) relative to the conventional method, and suppresses the residual vibration of mode-2 relative to the conventional method, in accordance with aspects and among other advantages of the present disclosure. Thus, further advantages of the feedforward control using the sampled-data polydyne in accordance with aspects of the present disclosure have been confirmed. While the examples of seventh-order and eleventh-order order polydyne inputs are discussed here, other examples may include polydyne inputs of any order consistent with the principles of this disclosure.

3.4 Eighth and Twelfth-Order Sampled-Data Polydyne

A sixth-order polynomial may be selected for a short settling time trajectory, which has smaller absolute values of accelerations around the end of a seek motion than the absolute values of accelerations around the beginning of a seek motion. "Around the end" of a seek motion may refer to being within any reasonable interval of time leading up to the end of a seek motion, from the latter half of a seek motion, to any smaller interval of time within the latter half of the seek motion, and "around the beginning" of a seek motion may refer to being within any reasonable interval of time from the start of a seek motion, from the first half of a seek motion, to any smaller interval of time within the first half of the seek motion, in different examples. As a sixth-order sampled-data polydyne cannot be formulated, eighth and twelfth-order polydyne inputs were chosen for comparison with the sixth-order polynomial, since the eighth and twelfth-order polydyne have somewhat similar shapes to the sixth-order polynomial. In aspects of this disclosure, eighth and twelfth-order polydyne inputs may also implement a short settling time trajectory, and smaller absolute values of accelerations around the end of a seek motion than at the beginning.

FIGS. 9A and 9B show graphs 910 and 920 of the feedforward input position (in microns) and force (in newtons), respectively, over time (in milliseconds) using eighth and twelfth-order sampled-data polydyne controls in accordance with aspects of this disclosure compared to the sixth-order sampled-data polynomials. Graph 910 shows polynomial input position 912 over time, eighth-order polydyne input position 914 over time, and twelfth-order polydyne input position 916 over time. Graph 920 shows polynomial input force 922 over time, eighth-order polydyne input force 924 over time, and twelfth-order polydyne input position 926 over time. FIG. 9C shows graph 930 of tracking errors of position (in microns) over time (in milliseconds) for examples of eighth and twelfth-order polydyne input, in accordance with aspects of this disclosure, and the sixth-order polynomial. Graph 930 shows polynomial input position tracking error 932 over time, eighth-order polydyne input position tracking error 934 over time, and twelfth-order polydyne input position tracking error 936 over time. It is shown that tracking error after seek motion (e.g., after 0.9 milliseconds) was substantially reduced by the eighth-order sampled-data polydyne and even more so by the twelfth-order sampled-data polydyne, in accordance with aspects of this disclosure, and demonstrating further advantages of aspects of the present disclosure, compared to the sixth-order sampled-data polynomial. The parameters of the sampled-data polydyne control input examples shown in FIGS. 5A-B, 8A-B, and 9A—B are summarized in Table 2, above.

Figure 10A:
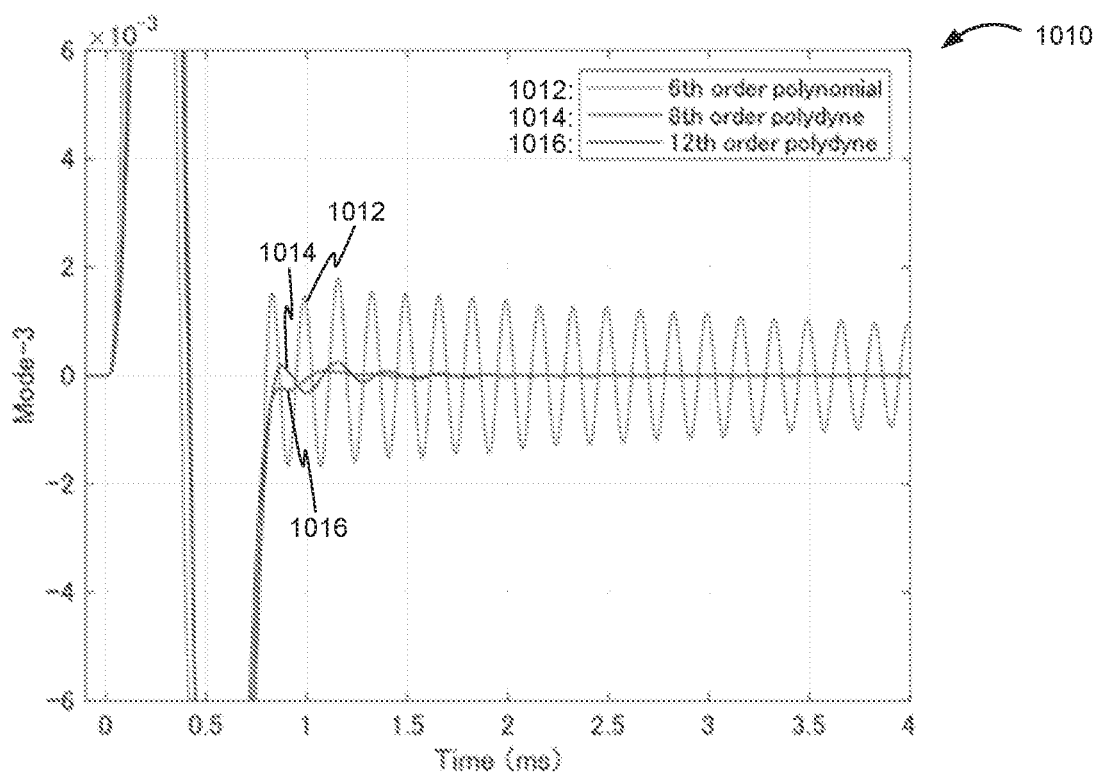
FIGS. 10A and 10B show graphs of the residual vibrations of mode-3 and mode-2, respectively, over time, in the examples of the sixth-order sampled-data polynomial and the eighth and twelfth-order sampled-data polydyne in accordance with aspects of this disclosure, in the actuator model.
Figure 10B:
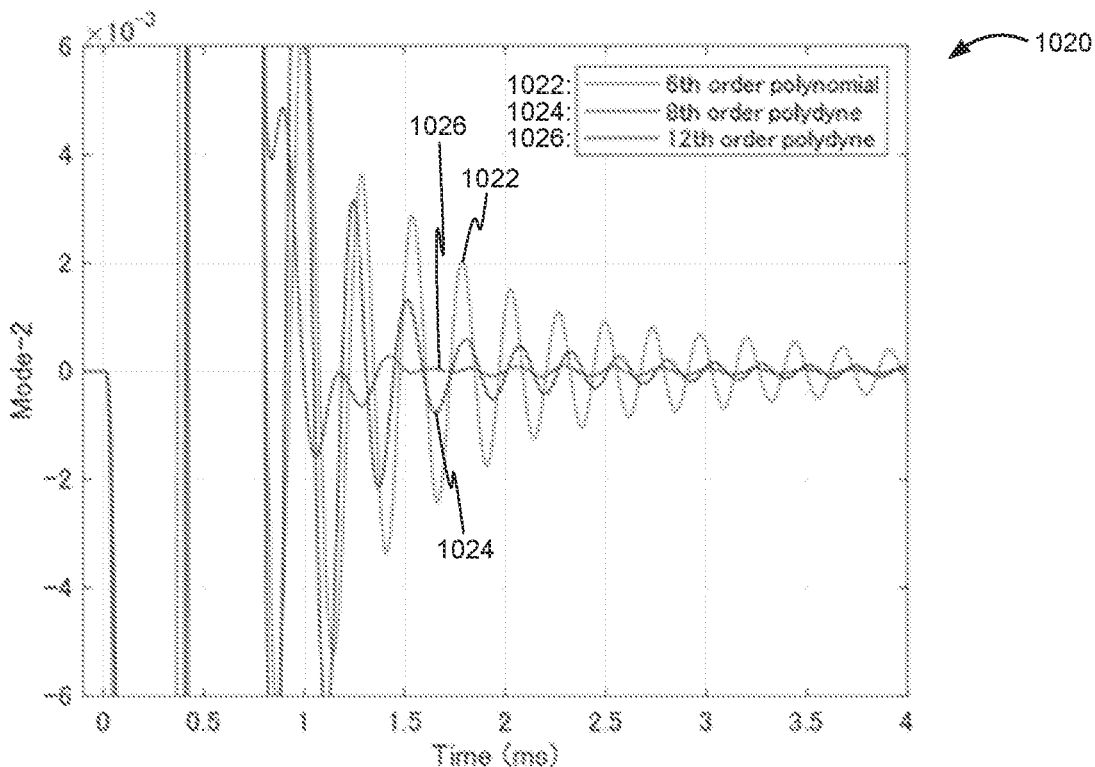

FIGS. 10A and 10B show graphs 1010 and 1020 of the residual vibrations of mode-3 and mode-2, respectively, in nanometers, over time, in milliseconds, in the examples of the sixth-order sampled-data polynomial and the eighth and twelfth-order sampled-data polydyne in accordance with aspects of this disclosure, in the actuator model. With the simulation using the same controller and mechanical model, both the sixth-order polynomial mode-3 residual vibrations 1012 as shown in FIG. 10A and polynomial mode-2 residual vibrations 1022 as shown in FIG. 10B remain persistent for a long time. On the other hand, the eighth and twelfth- order polydyne inputs substantially or completely suppressed the residual vibrations of mode-3, as shown by eighth-order polydyne input residual vibration curve 1014 and twelfth-order polydyne input residual vibration curve 1016 in FIG. 10A, in accordance with aspects of this disclosure; and the eighth and twelfth-order polydyne inputs substantially or completely suppressed the residual vibrations of mode-2, as shown by eighth-order polydyne input residual vibration curve 1024 and twelfth-order polydyne input residual vibration curve 1026 in FIG. 10B, in accordance with aspects of this disclosure, with a particular advantage in the example of twelfth-order polydyne, as shown in FIG. 10B. FIGS. 10A and 10B thus further demonstrate novel advantages of aspects of the present disclosure over the conventional art. While the examples of eighth-order and twelfth-order order polydyne inputs are discussed here, other examples may include polydyne inputs of any order consistent with the principles of this disclosure.

4. Conclusions

In illustrative aspects of this disclosure, a high-speed and high-precision positioning control system uses sampled-data polydyne as a feedforward input that may substantially suppress and/or may not excite specified mechanical resonant modes. Examples of polydyne curves in aspects of this disclosure may be derived in a continuous-time domain by applying an integral by part to Duhamel's integral repeatedly. Examples of sampled-data polydyne in aspects of this disclosure may be derived in the same way. Various aspects of this disclosure may extend polydyne curves to sampled-data systems in which derivatives of polynomials and conditions of continuity are defined in a discrete-time domain. Simulations of seek control in a hard disk drive have been performed to demonstrate that feedforward input using sampled-data polydyne may suppress the residual vibration of a control object, among various other advantages and aspects of this disclosure. The simulation results were compared with a conventional method using sampled-data polynomial. Seventh and eleventh-order polydyne inputs in aspects of this disclosure were compared to a seventh-order sampled-data polynomial, in a one-degree-of-freedom model, and eighth and twelfth-order polydyne inputs in aspects of this disclosure were compared to a sixth-order polynomial. In both of these illustrative examples of this disclosure, it has been confirmed that examples of a sampled-data polydyne may substantially suppress residual vibrations and improved the tracking error after seek motion, relative to the prior art. Furthermore, it has been confirmed that examples of this disclosure may use the damping ratio of a closed-loop system in generating sampled-data polydyne inputs, instead of that of the control object, in accordance with aspects of this disclosure.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for using sampled-data polydyne feedforward inputs in a positioning control system, and other aspects of this disclosure. Persons skilled in the relevant fields of art will be well-equipped by this disclosure with an understanding and an informed reduction to practice of a wide panoply of further applications, architectures, techniques, and methods for using sampled-data polydyne feedforward inputs in a positioning control system, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

control input to the actuator.

What is claimed is:

1. A system comprising:
   an actuator;
   a control object, controlled by the actuator; and
   one or more processing devices, configured to perform positioning control of the control object via the actuator, wherein performing the positioning control comprises:
   generating a feedforward polydyne positioning control input configured to suppress at least one resonant mode; and
   outputting the feedforward polydyne positioning control input to the actuator.

2. The system of claim 1, wherein the system comprises a data storage system comprising one or more disks, and the control object comprises a read/write head suspended by the actuator proximate to a disk surface of the one or more disks.

3. The system of claim 1, wherein generating the feedforward polydyne positioning control input comprises generating at least a seventh-order polydyne to suppress the at least one resonant mode.

4. The system of claim 1, wherein generating the feedforward polydyne positioning control input comprises generating at least an eleventh-order polydyne to suppress at least two resonant modes.

5. The system of claim 1, wherein generating the feedforward polydyne positioning control input comprises generating at least an eighth-order polydyne to implement a smaller absolute value of acceleration around the end of a seek motion than at a beginning of the seek motion.

6. The system of claim 1, wherein generating the feedforward polydyne positioning control input comprises generating a twelfth-order polydyne to implement the smaller absolute value of acceleration around the end of the seek motion than at the beginning.

7. The system of claim 1, wherein generating the feedforward polydyne positioning control input comprises generating a feedforward polydyne acceleration trajectory for the control object.

8. The system of claim 1, wherein generating the feedforward polydyne positioning control input comprises generating the feedforward polydyne positioning control input with a zeroth-order hold.

9. The system of claim 1, wherein generating the feedforward polydyne positioning control input comprises generating the feedforward polydyne positioning control input in discretized steps.

10. The system of claim 1, wherein the system comprises a closed-loop system, and wherein generating the feedforward polydyne positioning control input comprises using a damping ratio of the closed-loop system.

11. The system of claim 1, wherein generating the feedforward polydyne positioning control input comprises generating a sampled-data polydyne based on a basis polynomial $u_0[i]$ of acceleration trajectory that satisfies boundary conditions in a velocity $v[i]$ and a position $p[i]$ that are the same as of a sampled-data polynomial, $$v[0] = p[0] = 0,$$

$$v[N] = \tau \sum_{i=1}^{N-1} u_0[i] = 0,$$

$$p[N] = \frac{1}{2}\tau^2 \sum_{i=1}^{N-1}(2(N-i)-1)u_0[i] = P_t,$$

and such that the acceleration and derivatives satisfy the conditions, $$u_0[1] = u'_0[1] = \ldots u_0^{(M-1)} = 0$$

$$u_0[N] = u'_0[N] = \ldots = u_0^{(M+L-1)}[N] = 0$$

where $\zeta$ is the time step, N is the seek time (in number of steps), $P_t$ is the target seek length, and M and L are integers to be defined according to the order of polynomial.

12. The system of claim 11, wherein the basis polynomial $u_0[i]$ is defined as, $$u_0[1] = \left(\frac{i}{N_{ML}}\right)\left(\frac{i}{N_{ML}} - 1\right)\sum_{r=0}^{2M+L+1} a_r\left(\frac{i}{N_{ML}} - t_m\right)^r,$$

the conditions in the velocity and position at final step are, $$v[N] = \sum_{r=0}^{2M+L+1} a_r \sum_{i=1}^{N}\left(\frac{i}{N_{ML}}\right)\left(\frac{i}{N_{ML}} - 1\right)\left(\frac{i}{N_{ML}} - t_m\right)^r = 0,$$

$$p[N] = \sum_{r=0}^{2M+L+1} a_r \sum_{i=1}^{N}\left(\frac{i}{N_{ML}}\right)^2\left(\frac{i}{N_{ML}} - 1\right)\left(\frac{i}{N_{ML}} - t_m\right)^r = -\frac{P_t}{N_{ML}\tau^2},$$

the conditions in the derivatives at the initial step are, $$u_0[1] = \sum_{r=0}^{2M+L+1} a_r \sum_{i=1}^{N}\left(\frac{1}{N_{ML}}\right)\left(\frac{1}{N_{ML}} - 1\right)\left(\frac{1}{N_{ML}} - t_m\right)^r = 0,$$

$$\vdots$$

$$u_0[M] = \sum_{r=0}^{2M+L+1} a_r \sum_{i=1}^{N}\left(\frac{M}{N_{ML}}\right)\left(\frac{M}{N_{ML}} - 1\right)\left(\frac{M}{N_{ML}} - t_m\right)^r = 0,$$

and the conditions in the derivatives at the final step are, $$u_0[N] = \sum_{r=0}^{2M+L+1} a_r \sum_{i=1}^{N}\left(\frac{N}{N_{ML}}\right)\left(\frac{N}{N_{ML}} - 1\right)\left(\frac{N}{N_{ML}} - t_m\right)^r = 0,$$

$$\vdots$$

$$u_0[N_{ML}-1] = \sum_{r=0}^{2M+L+1} a_r \sum_{i=1}^{N}\left(\frac{N_{ML}-1}{N_{ML}}\right)\left(\frac{N_{ML}-1}{N_{ML}} - 1\right)\left(\frac{N_{ML}-1}{N_{ML}} - t_m\right)^r = 0,$$

where $\alpha_r$ are the coefficients of the basis polynomial, M is the number of boundary conditions at the initial step, M+L is the number of boundary conditions at the final step, and NML=N+M+L, the order of the polynomial is 2M+L+3, and $t_m$, is an arbitrary real constant.

13. The system of claim 1, wherein generating the feedforward polydyne positioning control input comprises generating a feedforward polydyne curve based on a polynomial $f_0(t)$ of a time t and a feedforward input f(t), wherein the polynomial $f_0(t)$ satisfies the following conditions, $$f_0(0) = f'_0(0) = f_0(T) = f'_0(T) = 0$$

and the feedforward input f(t) is defined by using real constants α and β as follows, $$f(t) = f_0(t) + \alpha f_0'(t) + \beta f_0''(t),$$

$$\sum_{k=2}^{n} \lambda^{-(k+1)}(1 + \alpha\lambda + \beta\lambda^2) f_0^{(k)}(0) = 0,$$

$$1 + \alpha\lambda + \beta\lambda^2 = 0,$$

$$\alpha = \zeta\omega_n^{-1},$$

$$\beta = \omega_n^{-2}.$$

14. The system of claim 1, wherein generating the feedforward polydyne positioning control input comprises generating a polydyne feedforward input u[i] formulated as $$u[i] = u_0[i] + (\alpha_1+\alpha_2)u'_0[i] + (\beta_1+\alpha_1\alpha_2+\beta_2)u''_0[i] + (\alpha_1\beta_2+\alpha_2\beta_1)u'''_0[i] + \beta_1\beta_2 u''''_0[i],$$

having real constants $\alpha_1$, $\alpha_2$, $\beta_1$, and $\beta_2$, defined by $$\alpha_1 = \left(\frac{i_{11}}{i_{21}} r_{21} - r_{11}\right)^{-1},$$

$$\beta_1 = \left(\frac{i_{21}}{i_{11}} r_{11} - r_{21}\right)^{-1},$$

$$\alpha_2 = \left(\frac{i_{12}}{i_{22}} r_{22} - r_{12}\right)^{-1},$$

$$\beta_2 = \left(\frac{i_{22}}{i_{12}} r_{12} - r_{22}\right)^{-1},$$

where, $r_{11} = \Re[(e^{\lambda_1 \tau}-1)\tau^{-1}]$, $i_{11} = \Im[(e^{\lambda_1 \tau}-1)\tau^{-1}]$, $r_{21} = \Re[(e^{\lambda_1 \tau}-1)^2 \tau^{-2}]$, $i_{21} = \Im[(e^{\lambda_1 \tau}-1)^2 \tau^{-2}]$, $r_{12} = \Re[(e^{\lambda_2 \tau}-1)\tau^{-1}]$, $i_{12} = \Im[(e^{\lambda_2 \tau}-1)\tau^{-1}]$, $r_{22} = \Re[(e^{\lambda_2 \tau}-1)^2 \tau^{-2}]$, $i_{22} = \Im[(e^{\lambda_2 \tau}-1)^2 \tau^{-2}]$ $\lambda_1 = (-\zeta_1 + j\sqrt{1-\zeta_1^2})\omega_1$, $\lambda_2 = (-\zeta_2 + j\sqrt{1-\zeta_2^2})\omega_2$.

15. A method comprising:
generating, by one or more processing devices, a feedforward polydyne positioning control input configured to suppress at least one resonant mode; and
outputting, by the one or more processing devices, the feedforward polydyne positioning control input to an actuator that controls a control object, thereby performing positioning control of the control object.

16. The system of claim 15, wherein generating the feedforward polydyne positioning control input comprises generating at least a seventh-order polydyne to suppress the at least one resonant mode.

17. The method of claim 15, wherein generating the feedforward polydyne positioning control input comprises generating at least an eighth-order polydyne to implement a smaller absolute value of acceleration around the end of a seek motion than at a beginning of the seek motion.

18. One or more processing devices comprising:
means for generating a feedforward polydyne positioning control input, wherein the means for generating comprises means for generating at least a seventh-order polydyne to suppress at least one resonant mode; and
means for outputting the feedforward polydyne positioning control input to an actuator that controls a control object, thereby performing positioning control of the control object.

19. The system of claim 18, wherein generating the feedforward polydyne positioning control input comprises generating at least a seventh-order polydyne to suppress the at least one resonant mode.

20. The one or more processing devices of claim 18, wherein the means for generating the feedforward polydyne positioning control input comprises means for generating at least an eighth-order polydyne to implement a smaller absolute value of acceleration around the end of a seek motion than at a beginning of the seek motion.

* * * * *